US010548307B2

(12) United States Patent
Hertzler

(10) Patent No.: US 10,548,307 B2
(45) Date of Patent: Feb. 4, 2020

(54) FULLY ENCLOSED MOUSE TRAP WITH GUILLOTINE KILLING MECHANISM

(71) Applicant: Woodstream Corporation, Lititz, PA (US)

(72) Inventor: Todd Hertzler, Gordonville, PA (US)

(73) Assignee: WOODSTREAM CORPORATION, Lititz, PA (US)

(*) Notice: Subject to any disclaimer, the term of this patent is extended or adjusted under 35 U.S.C. 154(b) by 561 days.

(21) Appl. No.: 15/267,582

(22) Filed: Sep. 16, 2016

(65) Prior Publication Data

US 2018/0077920 A1 Mar. 22, 2018

(51) Int. Cl.
*A01M 27/00* (2006.01)
*A01M 23/36* (2006.01)
*A01M 23/20* (2006.01)
*A01M 23/18* (2006.01)
*A01M 23/02* (2006.01)
*A01M 23/08* (2006.01)

(52) U.S. Cl.
CPC ............ *A01M 27/00* (2013.01); *A01M 23/02* (2013.01); *A01M 23/08* (2013.01); *A01M 23/18* (2013.01); *A01M 23/20* (2013.01); *A01M 23/36* (2013.01)

(58) Field of Classification Search
CPC ...... A01M 23/16; A01M 23/18; A01M 23/20; A01M 23/24; A01M 23/36; A01M 27/00
USPC .......................................... 43/77–80, 60, 61
See application file for complete search history.

(56) References Cited

U.S. PATENT DOCUMENTS

| | | | | | |
|---|---|---|---|---|---|
| 365,763 | A | * | 6/1887 | Swan | A01M 23/36 43/79 |
| 432,139 | A | * | 7/1890 | Kerns | A01M 23/24 43/78 |
| 1,641,062 | A | * | 8/1927 | John Bacon | A01M 23/00 43/78 |
| 2,023,427 | A | * | 12/1935 | Laughlin | A01M 23/18 43/61 |
| 2,161,789 | A | * | 6/1939 | Wingfield | A01M 23/18 43/61 |
| 2,391,640 | A | * | 12/1945 | Nemec | A01M 23/20 43/61 |
| 2,446,168 | A | * | 8/1948 | Bricker | A01M 23/14 43/61 |
| 2,529,589 | A | * | 11/1950 | Biery | A01M 23/18 43/61 |
| 2,587,349 | A | * | 2/1952 | Mace | A01M 23/18 43/67 |
| 2,669,056 | A | * | 2/1954 | Lehman | A01M 23/20 43/79 |

(Continued)

FOREIGN PATENT DOCUMENTS

| | | | | |
|---|---|---|---|---|
| DE | 102007037275 | A1 * | 2/2009 | A01M 23/20 |
| EP | 1400172 | A1 * | 3/2004 | A01M 23/24 |

(Continued)

*Primary Examiner* — Darren W Ark
(74) *Attorney, Agent, or Firm* — Jacobson Holman, PLLC.

(57) ABSTRACT

An enclosure-type mouse trap having a compact footprint with a curved or U-shaped mouse pathway leading to a guillotine killing mechanism is provided. The trap has a bottom assembly, a top assembly, and a removable disposal door. The bottom assembly includes a pivoting link element operatively engaged with the top and bottom assemblies to set the trap and control the position of an entrance door that provides access to the trap interior.

10 Claims, 45 Drawing Sheets

(56) References Cited

U.S. PATENT DOCUMENTS

| | | | | |
|---|---|---|---|---|
| 2,774,175 A * | 12/1956 | Maddocks | A01M 23/18 | 43/61 |
| 2,793,464 A * | 5/1957 | Bird | A01M 23/02 | 43/61 |
| 2,803,918 A * | 8/1957 | Hall | A01M 23/22 | 43/61 |
| 2,869,280 A * | 1/1959 | Dobratz | A01M 23/08 | 43/77 |
| 4,187,634 A * | 2/1980 | Kintz | A01M 23/20 | 43/61 |
| 4,310,984 A * | 1/1982 | Brubaker, Jr. | A01M 23/20 | 43/61 |
| 4,578,893 A * | 4/1986 | Wickenberg | A01M 23/30 | 43/77 |
| 4,583,317 A * | 4/1986 | Beard | A01M 23/20 | 43/61 |
| 4,766,692 A * | 8/1988 | Shurden | A01M 23/20 | 43/61 |
| 5,123,200 A * | 6/1992 | Vance | A01M 23/24 | 43/61 |
| 5,501,031 A * | 3/1996 | Heilesen | A01M 23/20 | 43/61 |
| 5,720,125 A * | 2/1998 | Oviatt | A01M 23/04 | 43/61 |
| 5,943,813 A * | 8/1999 | Wang | A01M 23/18 | 43/61 |
| 6,990,767 B1 * | 1/2006 | Margalit | A01M 23/20 | 43/61 |
| 7,540,109 B2 * | 6/2009 | Hall | A01M 23/20 | 43/58 |
| 7,987,628 B2 * | 8/2011 | Le Laidier | A01M 23/22 | 43/60 |
| 8,146,289 B2 * | 4/2012 | Gauker | A01M 23/30 | 43/61 |
| 8,413,368 B2 * | 4/2013 | DeKalb | A01M 23/20 | 43/61 |
| 8,418,396 B2 * | 4/2013 | Moustirats | A01M 31/002 | 43/58 |
| 8,695,274 B2 * | 4/2014 | Gauker | A01M 23/08 | 43/61 |
| 9,003,692 B2 * | 4/2015 | Gauker | A01M 23/30 | 43/61 |
| 9,374,993 B2 * | 6/2016 | Smith | A01M 23/36 | |
| 2005/0279015 A1 * | 12/2005 | Hall | A01M 23/08 | 43/66 |
| 2006/0032110 A1 * | 2/2006 | Yang | A01M 1/026 | 43/60 |
| 2009/0313879 A1 * | 12/2009 | Vasyl | A01M 23/34 | 43/87 |
| 2011/0078939 A1 * | 4/2011 | Liao | A01M 23/18 | 43/61 |

FOREIGN PATENT DOCUMENTS

| | | | | |
|---|---|---|---|---|
| FR | 2658385 A1 * | 8/1991 | | A01M 23/20 |
| FR | 2740297 A1 * | 4/1997 | | A01M 23/20 |
| FR | 2795915 A1 * | 1/2001 | | A01M 23/20 |
| JP | 02203731 A * | 8/1990 | | A01M 23/30 |
| JP | 2002125570 A * | 5/2002 | | |
| JP | 2004135643 A * | 5/2004 | | |
| JP | 2012039928 A * | 3/2012 | | |
| JP | 2013005776 A * | 1/2013 | | |
| JP | 2014204707 A * | 10/2014 | | |

* cited by examiner

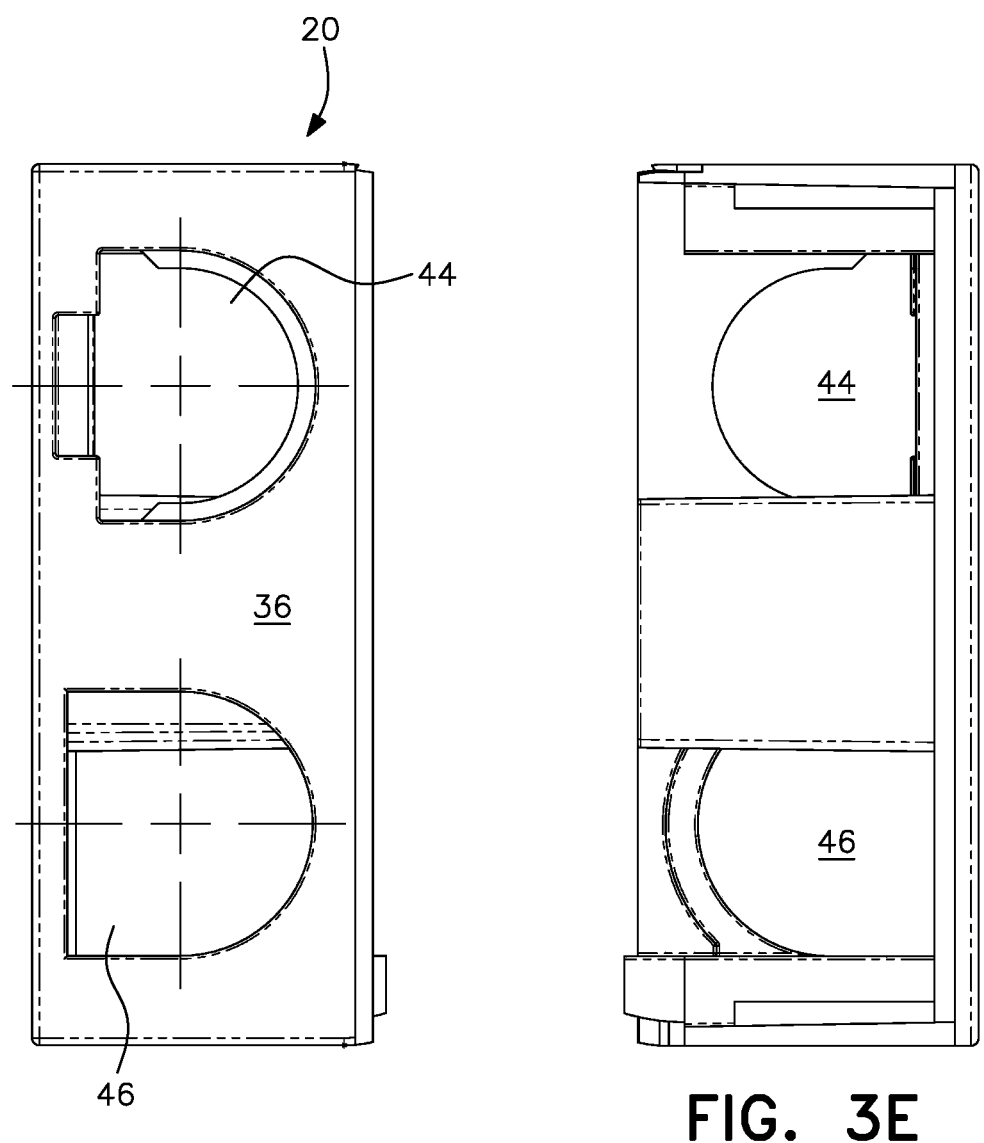

SECTION B-B

SECTION C-C

SECTION D-D

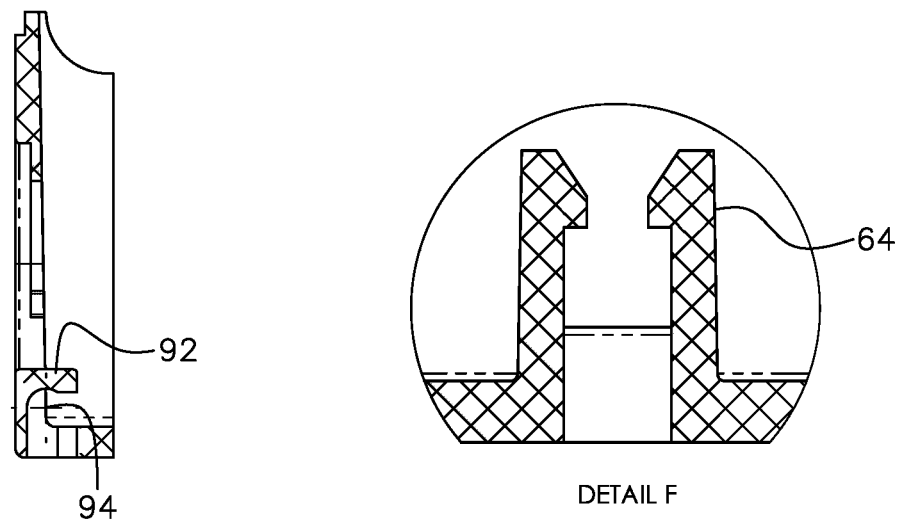
SECTION E-E
FIG. 3M
DETAIL F
FIG. 3N
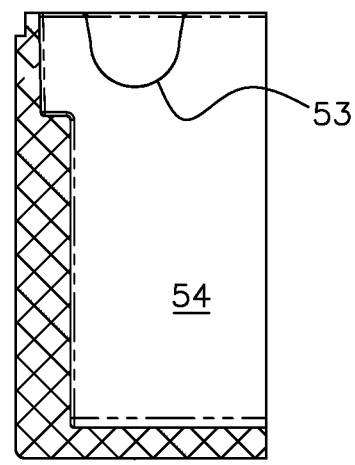
SECTION G-G
FIG. 3P

SECTION A-A

SECTION B-B

SECTION A-A

SECTION A-A

SECTION B-B

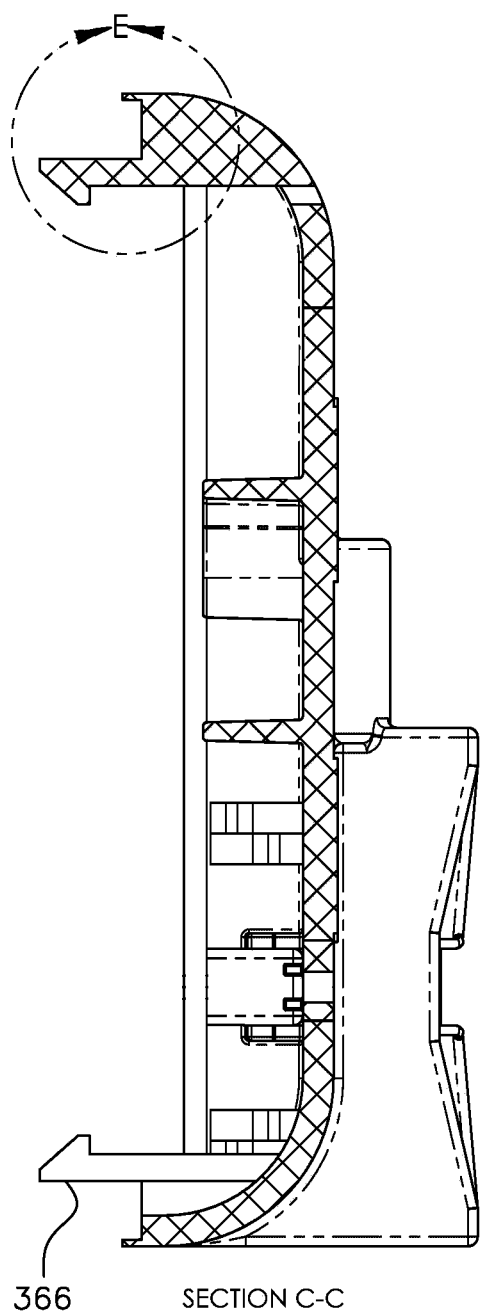
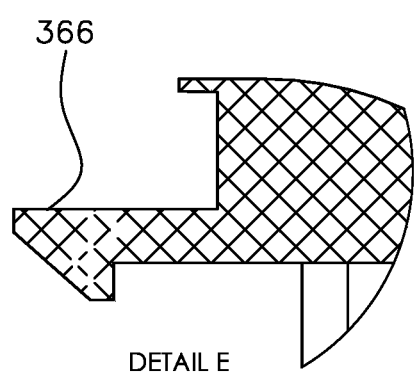
DETAIL E
FIG. 9L
SECTION C-C
FIG. 9K

SECTION D-D

SECTION F-F

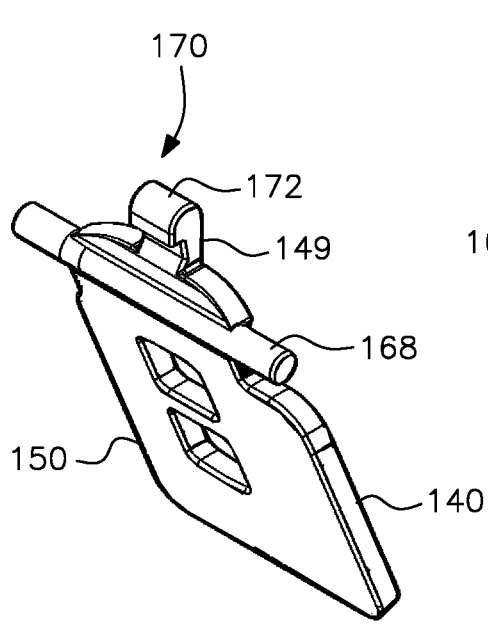
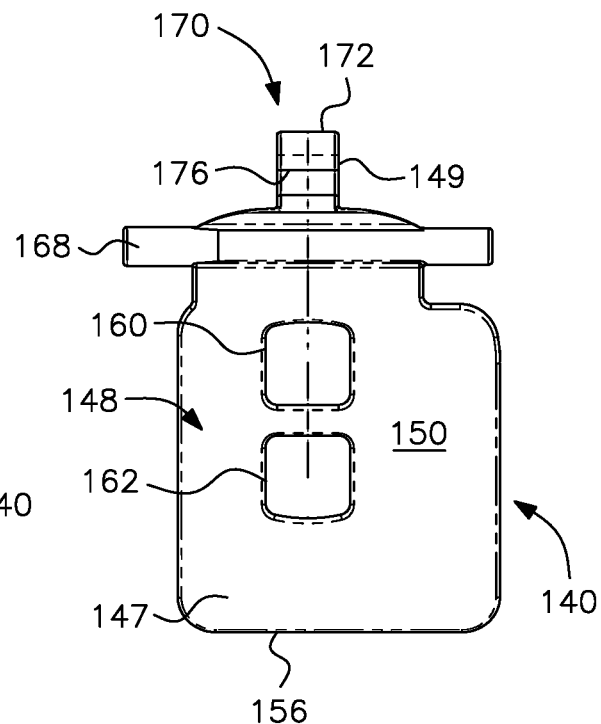
FIG. 10A
FIG. 10B
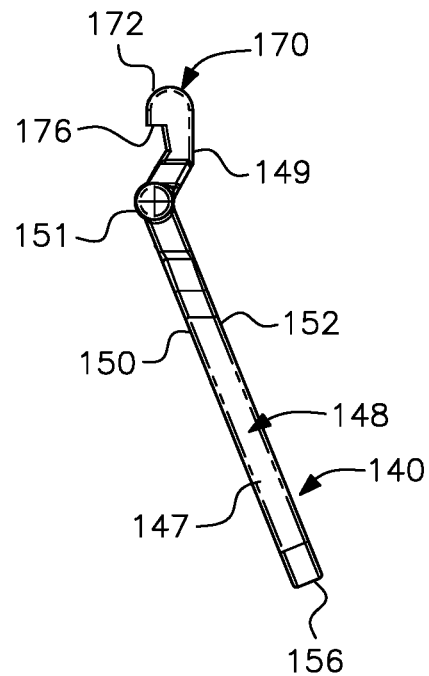
FIG. 10C

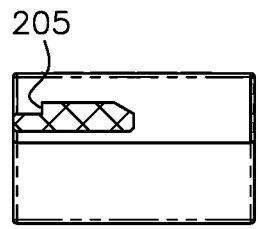
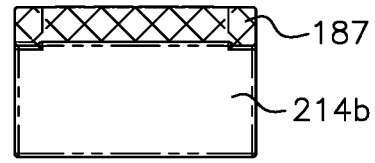
SECTION A-A
FIG. 12F
SECTION B-B
FIG. 12G
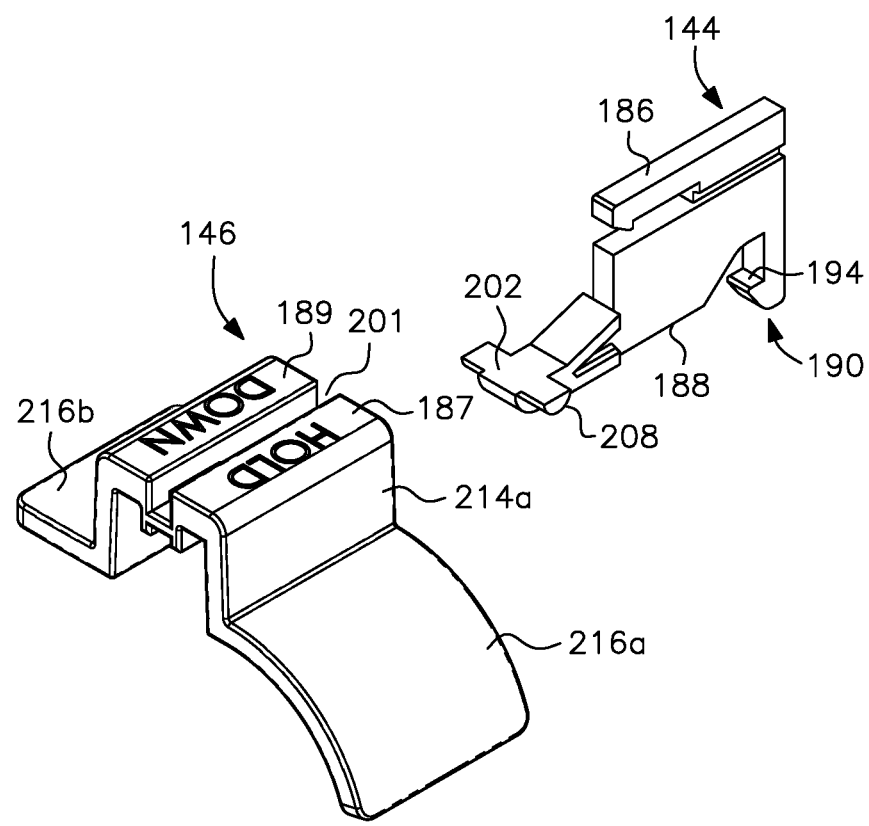
FIG. 12H

SECTION B-B

SECTION C-C

SECTION A-A

DETAIL B

FULLY ENCLOSED MOUSE TRAP WITH GUILLOTINE KILLING MECHANISM

FIELD OF THE INVENTION

The present invention is in the field of pest control and more specifically is directed to a trap for rodents and particularly mice.

BACKGROUND OF THE INVENTION

Many current methods of capturing and/or killing rodents such as mice are unsightly, unsanitary and can be dangerous. One example of such a method is the common snap trap with a spring operated mechanism that is released by a trigger. The trigger is actuated when a mouse attempts to remove the bait secured thereto. The spring operated mechanism snaps closed, instantly killing the rodent. The entire trap with the expired rodent is disposable. However, the sight of the dead rodent caught in the trap is not pleasant and it may spread bacteria in the area around the trap. These types of traps are also dangerous because they may injure children or family pets.

U.S. Pat. No. 8,146,289 ("the '289 patent") discloses a sealing enclosure-type mouse trap that relies on a snap-trap killing mechanism contained within a housing that shields the consumer from the sight of the dead rodent. A further style of trap is shown in U.S. Pat. No. 9,374,993 ("the '993 patent"). Like the '289 patent, the '933 patent discloses an enclosure-type mouse trap but with a guillotine killing mechanism. Both the '933patent and the '289 patent are co-owned by the Applicant of the instant application and both are hereby incorporated by reference in their entirety as if fully set forth herein.

While the rodent traps shown in both the '289 patent and the '993 patent are safe and effective, benefit could be derived from a trap with a smaller footprint enabling the trap to be placed in tight quarters while still being able to fully conceal the dead rodent and also being reusable, rendering the trap more economical to make and to use.

SUMMARY OF THE INVENTION

In view of the foregoing, the present invention is directed to an enclosure-type mouse trap having a bottom assembly, a top assembly, and a removable disposal door.

The bottom assembly includes a lower housing part, a bait door, an entrance door assembly and a pivoting link element operatively engaged with the top and bottom assemblies to set the trap and control access thereto by a mouse. The lower housing part has a floor that extends between a front or access side of the lower housing part and a rear or disposal side thereof. The access side of the lower housing part includes a front panel having a first aperture for the bait door and a second aperture or entrance opening associated with the entrance door assembly. The disposal side of the lower housing part is configured for removable attachment of the disposal door. As used herein, "front" or "forwardly" refers to that side of the trap nearest the front panel or that part of a component facing the access side, and "rear" or "rearwardly" refers to that part of the trap nearest the disposal door or that part of a component facing the disposal side of the lower housing part. The terms "top" and "upper", and similarly but conversely the terms "bottom" and "lower", refer to the spatial positioning of the identified element or component when the trap is assembled and positioned for use.

The bait door and the entrance door assembly are both arranged in the front panel of the lower housing part with the bait door being fitted in the bait door aperture and the entrance door assembly being mounted adjacent the entrance opening. The bait door has an open position that enables the user to place bait in the trap and a closed position when the trap is in use.

The entrance door assembly includes an entrance door having an arm, a door pin and a door spring. The entrance door is movable on the door pin between an open position that allows a rodent to access the interior of the trap and a closed position that fully blocks the entrance opening to prevent both entry to and exit from the trap. The door spring biases the door to the closed position. The entrance door arm is provided with a peg for engaging with the link element.

The top assembly includes an upper housing part, a trigger mechanism and a killing mechanism. The trigger mechanism includes a trip pedal positioned in the trap enclosure, a catch and a hold down component. The killing mechanism includes a guillotine and a guillotine spring.

The lower housing part, the upper housing part and the disposal door together define a trap enclosure. When the lower housing part and the upper housing part are secured to one another without the disposal door in place, the disposal side of the lower housing part has an open area to allow for removal of a dead rodent from the trap. When the trap is configured for use, the disposal door is secured to the lower housing part and closes the open area so that the interior of the trap enclosure may be accessed only through the entrance door. Complementary structures formed on the inner surfaces of the lower housing part and the upper housing part create a curved or U-shaped mouse pathway that extends from the entrance door to the bait door. The U-shape of the pathway increases the overall length of the pathway so that a mouse of average size is completely inside the trap before reaching the trip mechanism, ensuring the mouse is fully contained when the entrance door closes while retaining a smaller total footprint. The curvature of the pathway may also make it more difficult for the mouse to escape from the trap, should it attempt to do so.

The guillotine is oriented substantially perpendicular to the floor of the lower housing part and includes a lower part that extends into the trap enclosure and an upper part that projects above and outside the trap enclosure. The lower part is provided with a peg for engaging the pivoting link element, and the upper part is configured to be grasped by the user to pull up the guillotine to set the trap. When the trap is set, the guillotine engages with the catch, with the catch then holding the guillotine in a raised position above the floor. The guillotine spring is operatively coupled between the upper housing part and the guillotine and biases the guillotine to move rapidly to a lowered position adjacent the floor of the lower housing part when the guillotine becomes disengaged from the catch through movement of the trip pedal by a rodent inside the trap enclosure.

The pivoting link element has a rear end with a mounting pin, a front end with an elongated door peg aperture or slot, and a middle portion having an elongated curved guillotine peg aperture or slot. The mounting pin is pivotally captured in a clip structure on the floor of the lower housing part. The elongated door peg slot receives the link engaging peg that projects from the arm of the entrance door and the elongated curved guillotine peg slot receives the link engaging peg on the lower part of the guillotine. When the upper part of the guillotine is grasped and pulled upwardly, the engagement of the guillotine peg in the guillotine peg slot lifts the front end of the link element causing the link element to pivot on the mounting pin. As the front end moves upwardly, the engagement of the link engaging peg on the arm of the entrance door in the elongated door peg slot causes the entrance door to rotate on the door pin and move to the open position against the bias of the door spring. Once the guillotine is engaged on the catch such that the trap is set, the entrance door is held in the open position by the link element.

With the trap in use and the entrance door in the open position, a mouse enters the trap enclosure through the entrance opening and moves along the U-shaped pathway toward the bait behind the bait door. To reach the bait the mouse must come into contact with the trip pedal. The trap is triggered when movement of the trip pedal causes disengagement of the guillotine from the catch. Once released, the guillotine moves down rapidly under the bias of the guillotine spring. When no longer being held in the upward position by the engagement of the guillotine peg in the guillotine peg slot, the front end of the link element is free to move downwardly, allowing the entrance door to move to the closed position under the bias of the door spring.

The mouse trap of this invention can be reused and is preferably made of durable plastic, has a relatively simple construction, and is relatively small in size. The mechanics and physical structure of the mouse trap conceal the body of an expired rodent from view and allow for easy disposal. While the trap is primarily referred to herein as a "mouse trap", this terminology is intended to include other small rodents for which the trap might be used in the manner described.

Accordingly, it is an object of the present invention to provide a mouse trap having a guillotine killing mechanism with a compact footprint for use in small areas that efficiently kills a rodent and does not expose people and pets to any risk of injury while fully concealing the dispatched mouse prior to disposal thereof.

Another object of the present invention is to provide a mouse trap in accordance with the preceding object having a front panel with a bait door and an entrance door, and internal structural elements that define a semi-circular or U-shaped pathway inside the trap enclosure that extends between the two doors to guide the mouse from the entrance to the bait.

A further object of the present invention is to provide a mouse trap in accordance with the preceding objects that has a pivoting link element operatively engaged between the guillotine of the killing mechanism and the entrance door assembly such that upward movement of the guillotine to set the trap also opens the entrance door and, conversely, downward movement of the guillotine when the trap is tripped allows the entrance door to move to the closed position.

Yet a further object of the present invention is to provide a mouse trap in accordance with the preceding objects that is simple to set and use and which requires no electrical parts.

Still another object of the present invention is to provide a mouse trap in accordance with the preceding objects that is sturdy and suitable for both one-time use and multiple reuses in both indoor and outdoor environments.

It is yet another object of the invention to provide a mouse trap that is not complex in structure and which can be manufactured at low cost but yet efficiently kills and conceals an expired rodent from view until disposal thereof.

These and other objects of the invention, as well as many of the intended advantages thereof, will become more readily apparent when reference is made to the following description taken in conjunction with the accompanying drawings.

DESCRIPTION OF THE DRAWINGS

FIG. 3D is a front view of the lower housing part shown in FIG. 3C.

FIG. 3E is a rear view of the lower housing part shown in FIG. 3C.

FIG. 3M is a sectional view of the lower housing part taken along line E-E of FIG. 3C.

FIG. 3N is an enlarged view of Detail F of FIG. 3I.

FIG. 3P is a sectional view of the lower housing part taken along line G-G of FIG. 3C.

FIG. 9K is a sectional view taken along line C-C of FIG. 9D.

FIG. 9L is an enlarged view of Detail E of FIG. 9K.

FIG. 10A is a front perspective view of the trip pedal of the trap shown in FIG. 1.

FIG. 10B is a front view of the trip pedal shown in FIG. 10A.

FIG. 10C shows, with the front of the trap as the reference, a view of the right side of the trip pedal shown in FIG. 10B.

FIG. 12F is a sectional view taken along line A-A of FIG. 12C.

FIG. 12G is a sectional view taken along line B-B of FIG. 12C.

FIG. 12H is a perspective view of the catch and hold down component as oriented for assembly.

DETAILED DESCRIPTION OF THE PREFERRED EMBODIMENT

Figure 1:
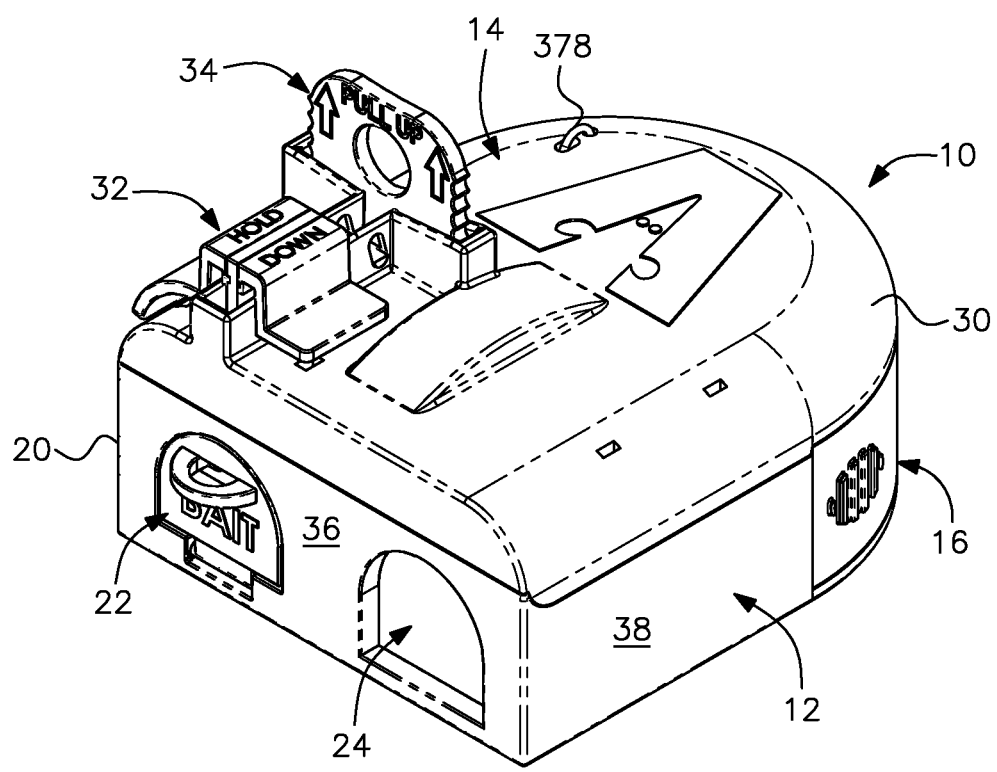
FIG. 1 is a perspective view of a mouse trap according to the present invention.

Although only one embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways.

Figure 2:
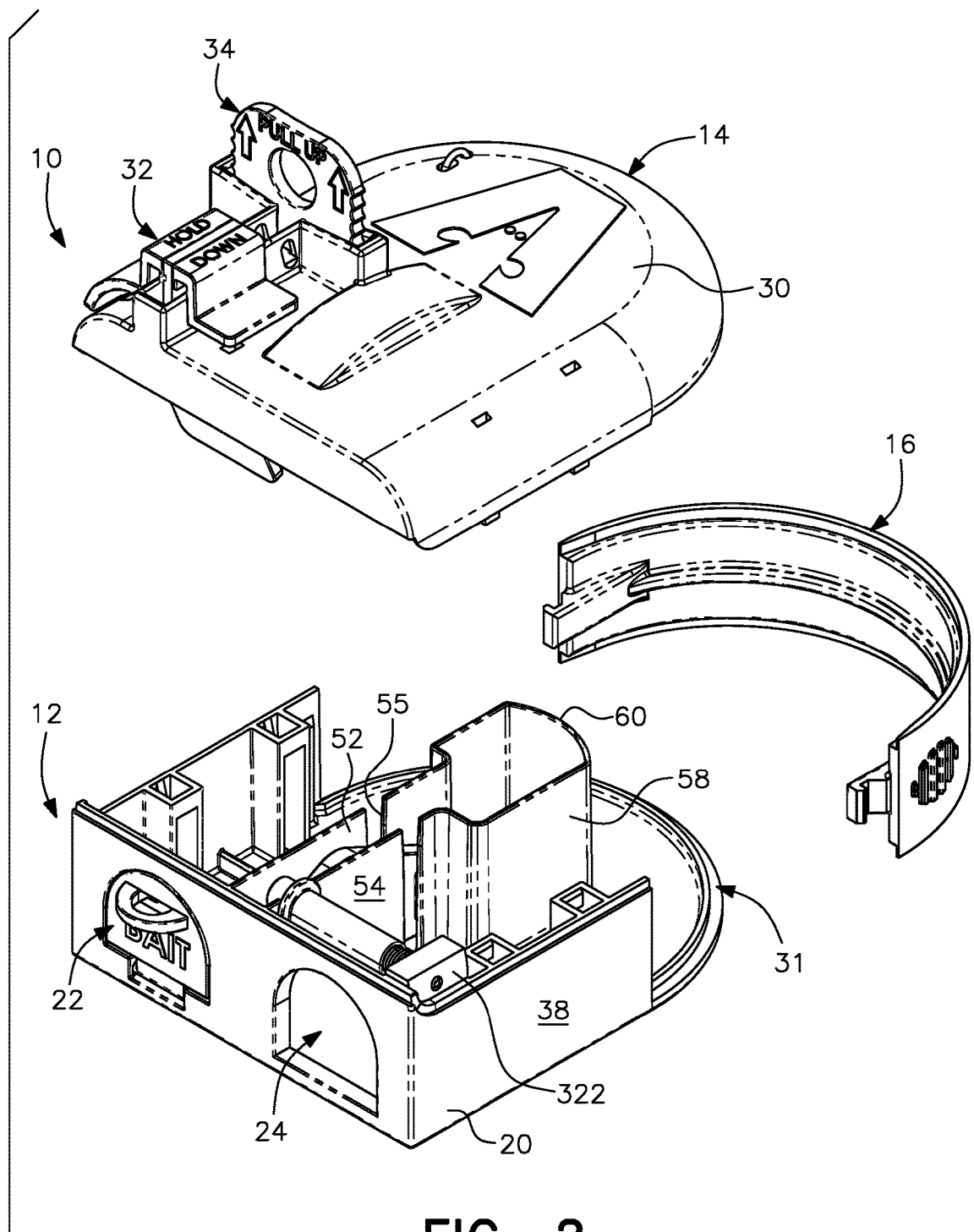
FIG. 2 is an exploded perspective view of the mouse trap shown in FIG. 1 illustrating the bottom assembly, the top assembly and the disposal door.

As shown in FIGS. 1 and 2, the present invention is directed to a mouse trap, generally designated by reference numeral 10. The mouse trap includes a bottom assembly generally designated by reference numeral 12, a top assembly generally designated by reference numeral 14, and a disposal door generally designated by reference numeral 16.

Figure 2A:
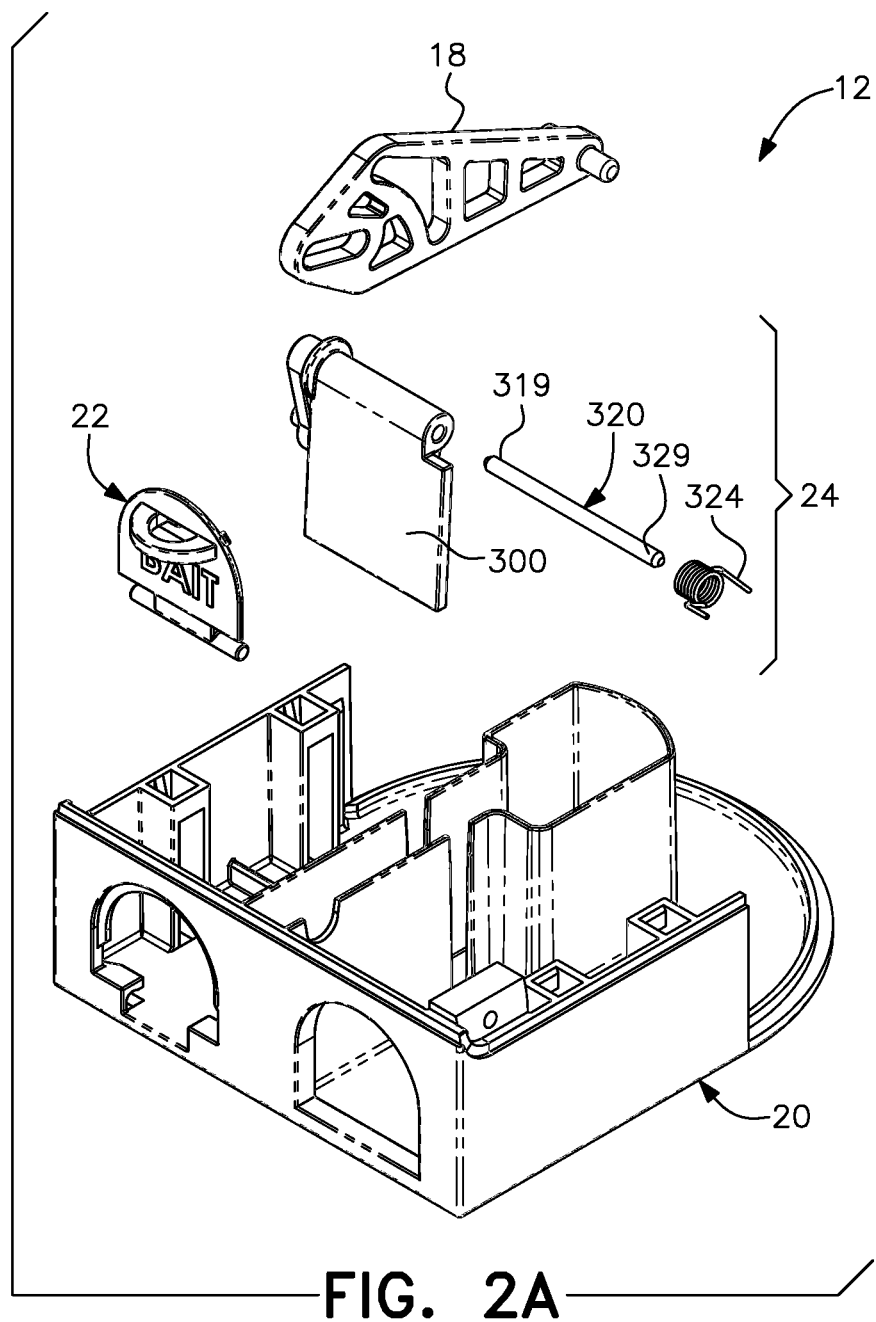
FIG. 2A is an exploded view of the bottom assembly shown in FIG. 2.
Figure 8A:
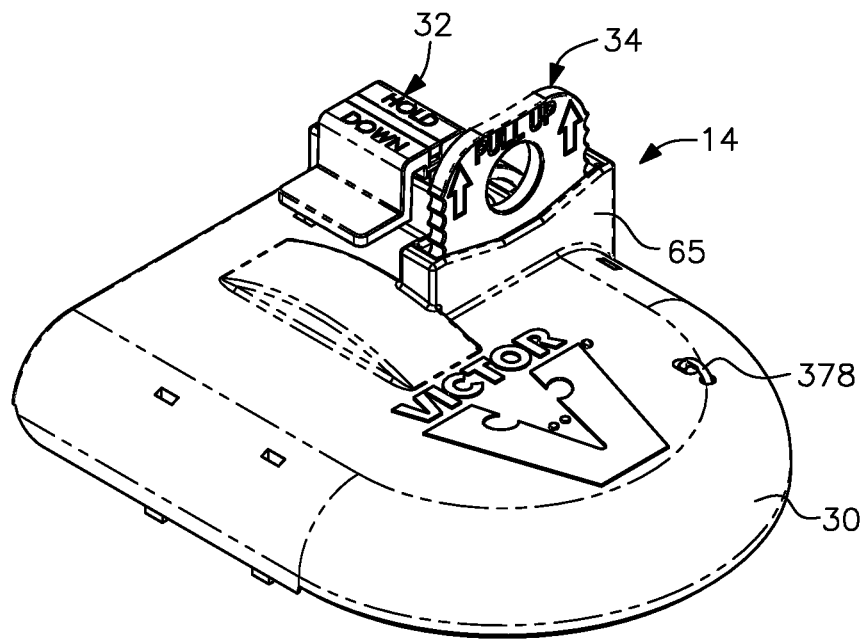
FIG. 8A is an upper perspective view of the top assembly of the mouse trap of FIG. 1.
Figure 8B:
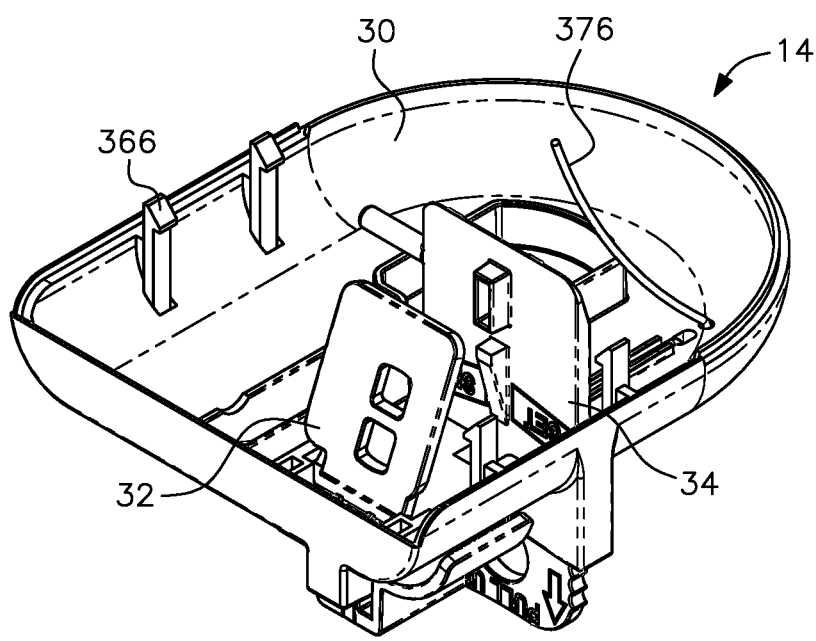
FIG. 8B is a perspective view of the under side of the top assembly shown in FIG. 8A.
Figure 8C:
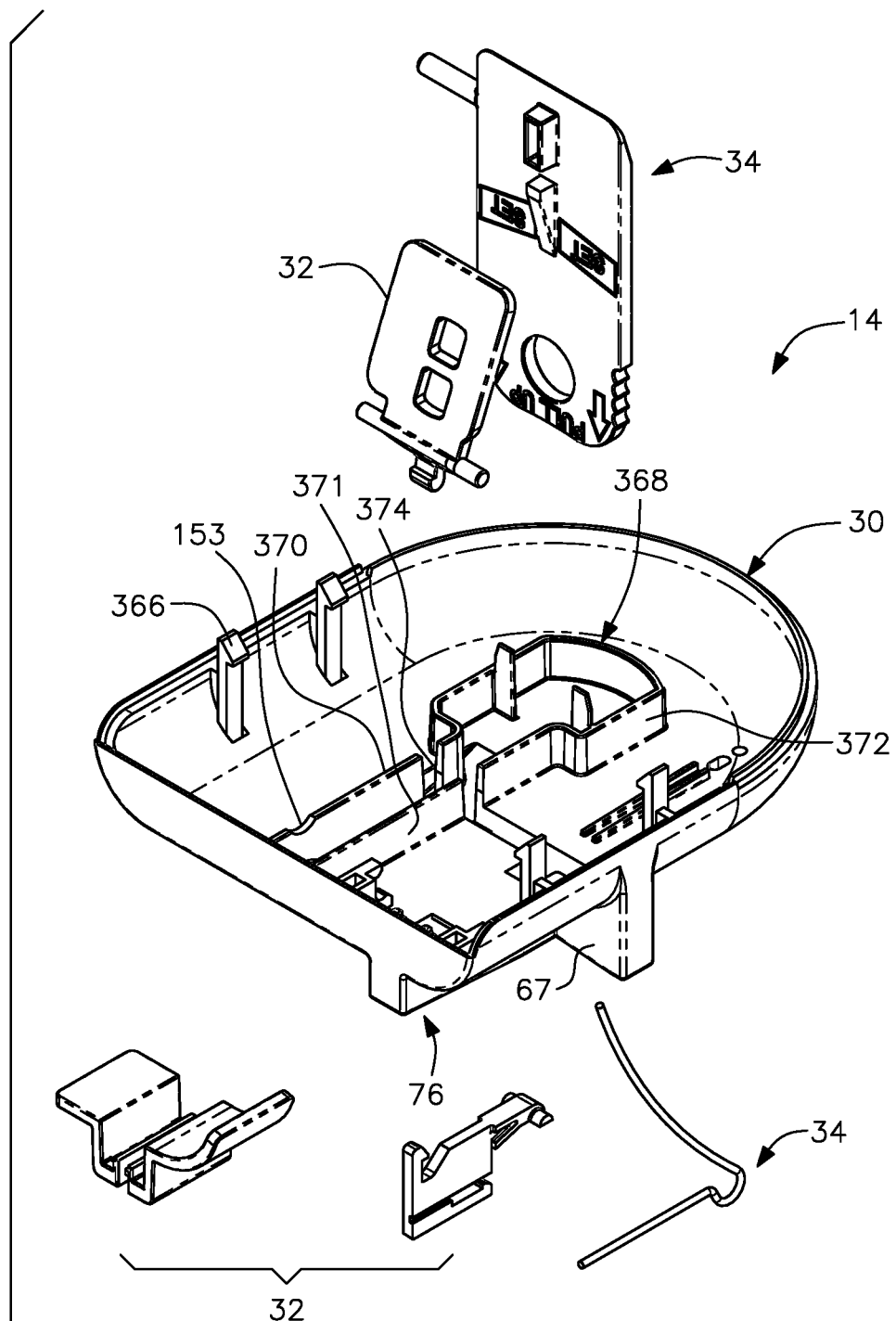
FIG. 8C is an exploded perspective view of the components of the top assembly shown in the under side view of FIG. 8B.

The bottom assembly 12, with all the components thereof best shown in FIG. 2A, includes a lower housing part 20, a bait door generally designated by reference numeral 22, an entrance door assembly generally designated by reference numeral 24 and a pivoting link element 18, The top assembly, shown in FIG. 8A-8C, includes an upper housing part 30, a trigger mechanism generally designated by reference numeral 32 and a killing mechanism generally designated by reference numeral 34. The lower housing part 20, the upper housing part 30 and the disposal door 16 together define a trap enclosure. When the lower housing part 20 and the upper housing part 30 are secured to one another without the disposal door 16 in place, the disposal side of the upper housing part and the lower housing part form a large open area, generally designated reference numeral 31, which allows for disposing of a dead rodent from the trap without touching the dead rodent as the rodent may be shaken out into a trash receptacle by gravity. When the trap is configured for use, the disposal door is secured to the lower housing part and closes the open area 31 so that the interior of the trap may be accessed only through the entrance opening (or second aperture) 46. In a preferred embodiment, the upper and lower housing parts and the disposal door are made of plastic but they can be made out of any other suitably strong and rigid material.

Figure 3A:
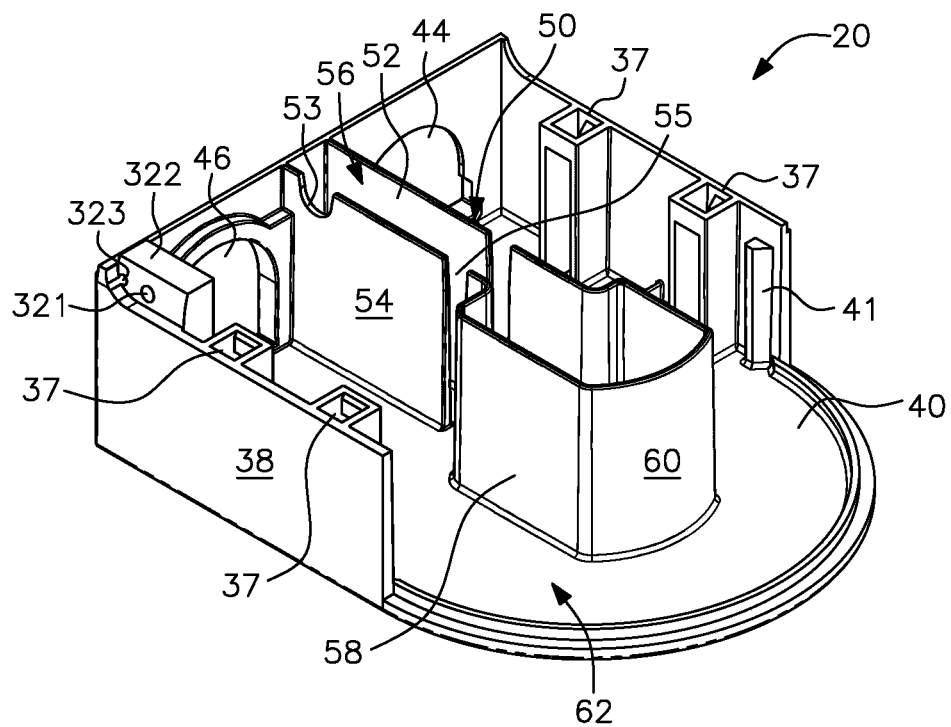
FIG. 3A is an upper perspective view of the lower housing part of the bottom assembly of the mouse trap of FIG. 1.
Figure 3B:
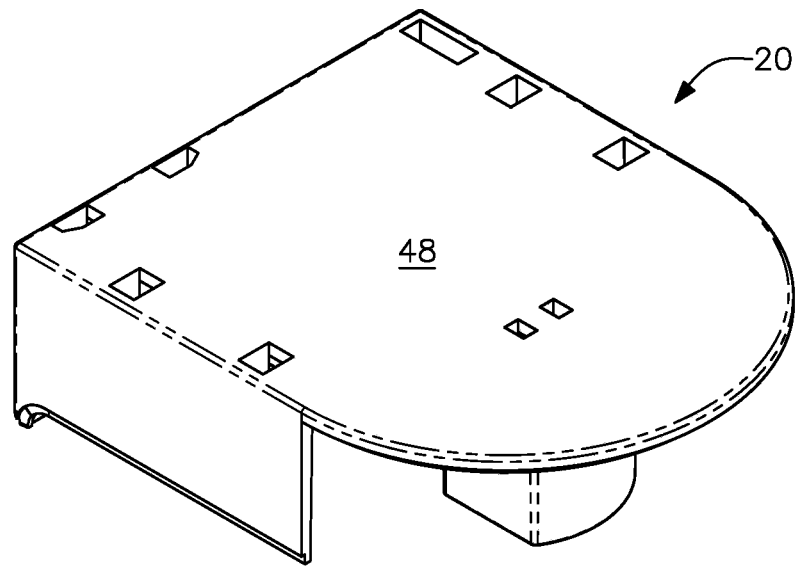
FIG. 3B is a perspective view of the underside of the lower housing part shown in FIG. 3A.

The lower housing part 20 is shown in various views in FIGS. 3A to 3P. The lower housing part 20 includes a front panel 36 at a front or access side, two side walls 38 that extend rearwardly and generally perpendicular to the front panel 36 and a floor 40 that extends from the front panel to a rearmost edge 42 at a rear or disposal side of the lower housing part 20. The rearmost edge 42 of the floor is preferably semi-circular and is configured for removable attachment of the disposal door 16.

Extending upwardly from the floor 40 are a plurality of structural members that include outer support/connecting posts 37 adjacent the side walls 38 on each of the left and right sides of the lower housing part, and a central dividing structure generally designated by reference numeral 50. As used herein, "left" and "right" are defined with respect to a view of the trap from the front side. Therefore, FIG. 3F shows the left side of the trap while FIG. 3G shows the right side thereof. The bottom surface 48 of the trap is planar and allows the trap to sit flush atop a flat surface such as a building floor or the bottom of a shelf or cabinet, preferably in a horizontal orientation.

The front panel 36 of the lower housing part 20 has a first aperture 44 for the bait door 22 and a second aperture or entrance opening 46 formed therein. The bait door 22 is fitted into the bait door aperture 44 and the entrance door assembly is mounted adjacent and above the entrance opening 46.

Figure 3C:
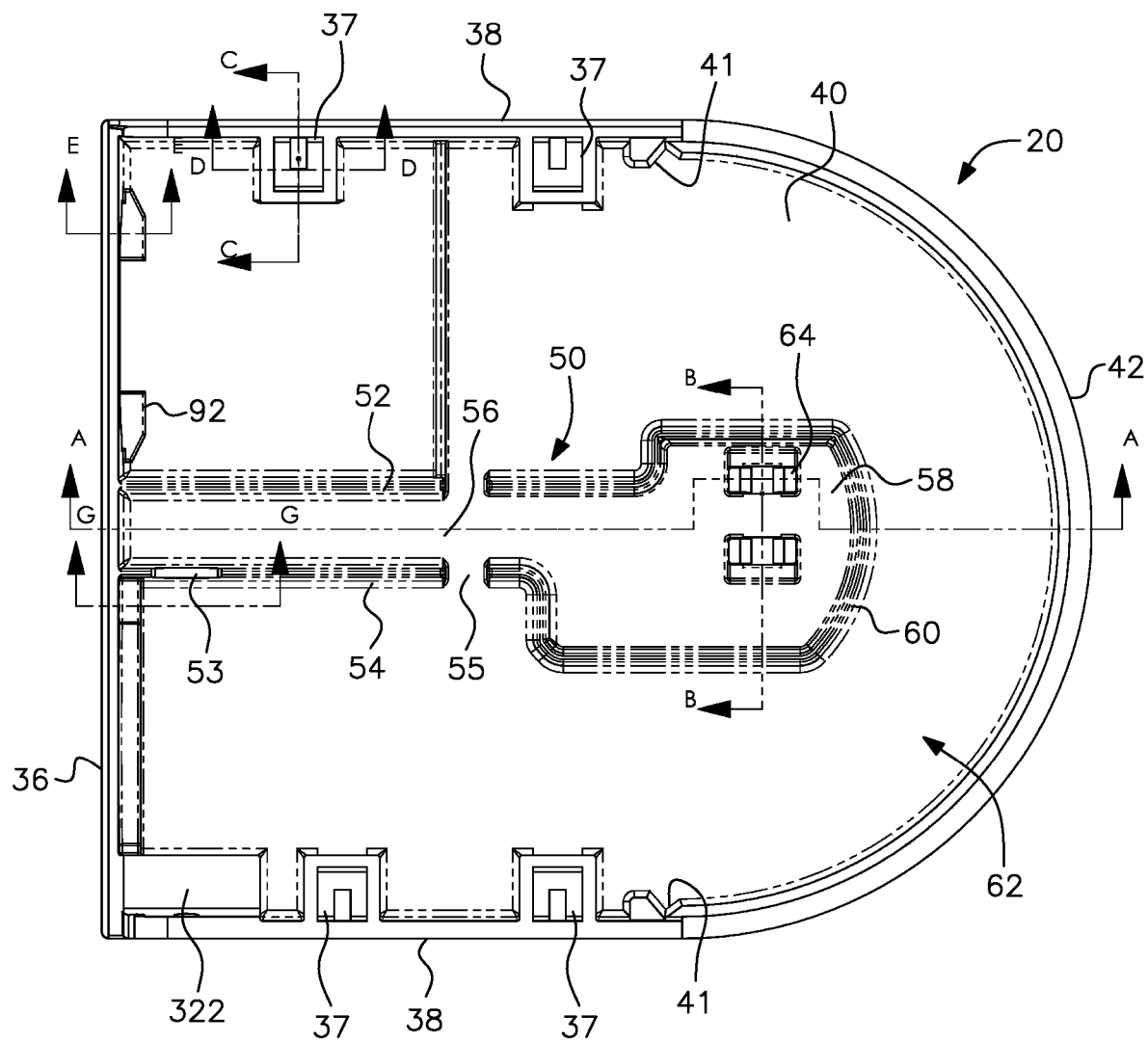
FIG. 3C is a top view of the lower housing part shown in FIGS. 3A and 3B.
Figure 3F:
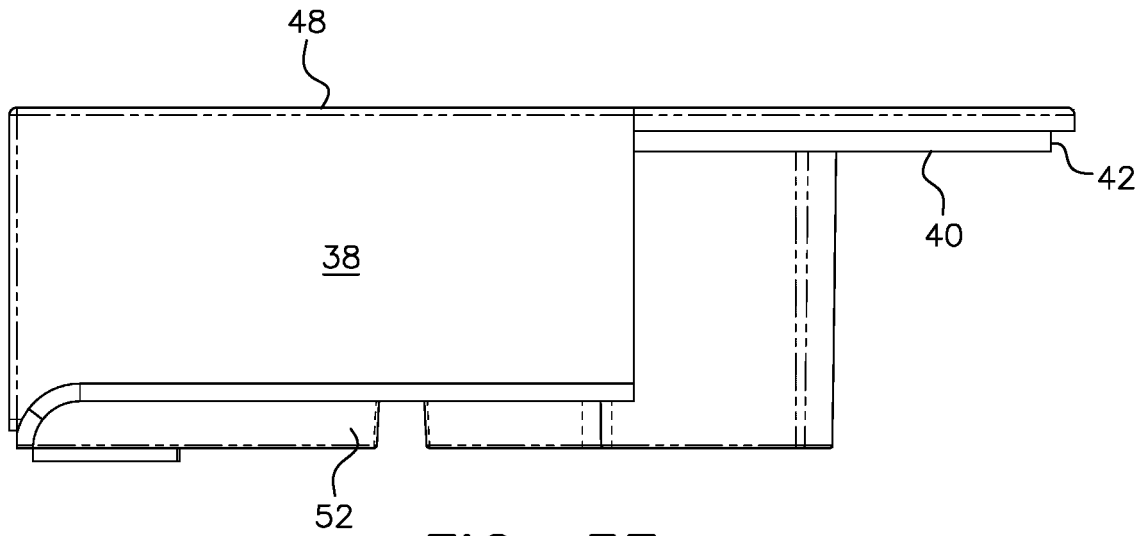
FIG. 3F shows, with the front of the trap as the reference, a view of the left side of the lower housing part shown in FIG. 3C.
Figure 3G:
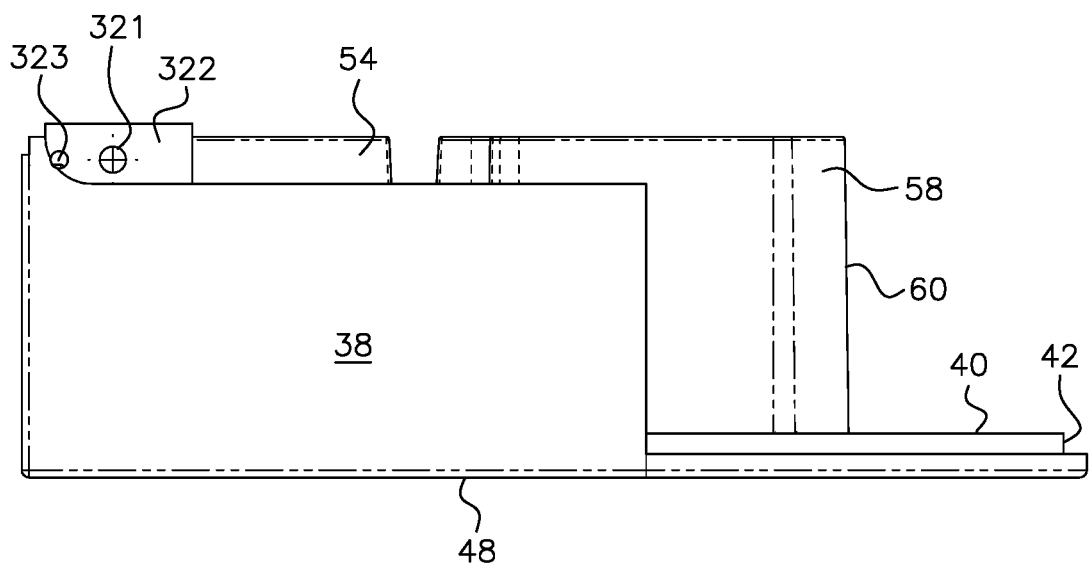
FIG. 3G shows, with the front of the trap as the reference, a view of the right side of the lower housing part shown in FIG. 3C.
Figure 3H:
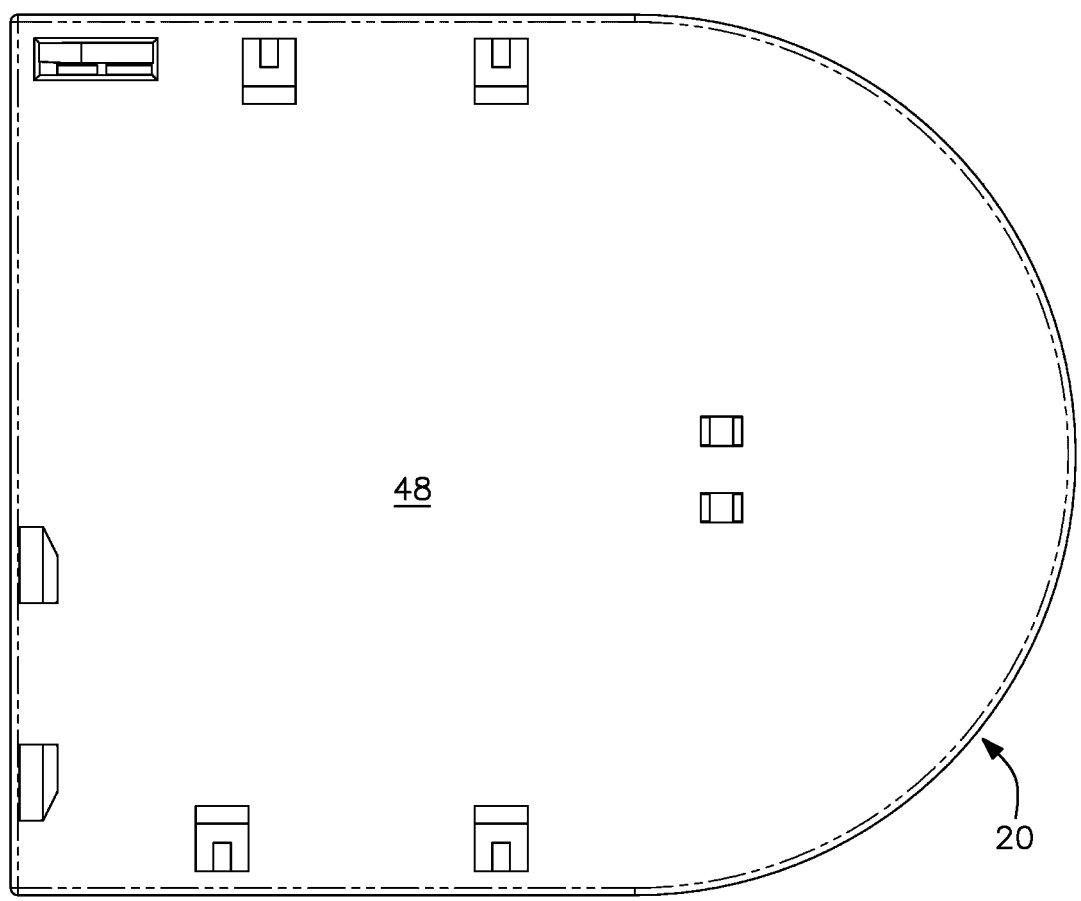
FIG. 3H is a bottom view of the lower housing part shown in FIG. 3C.
Figure 3I:
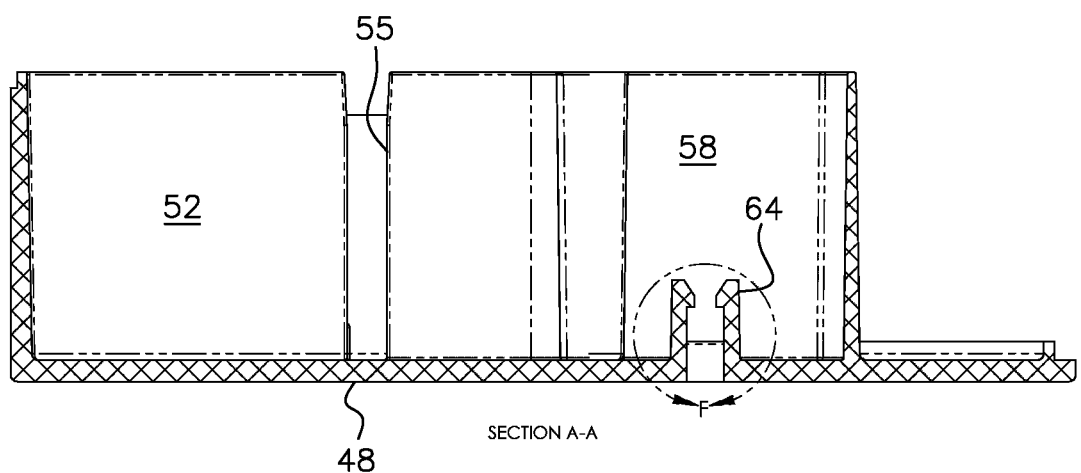
FIG. 3I is a sectional view of the lower housing part taken along line A-A of FIG. 3C.
Figure 3J:
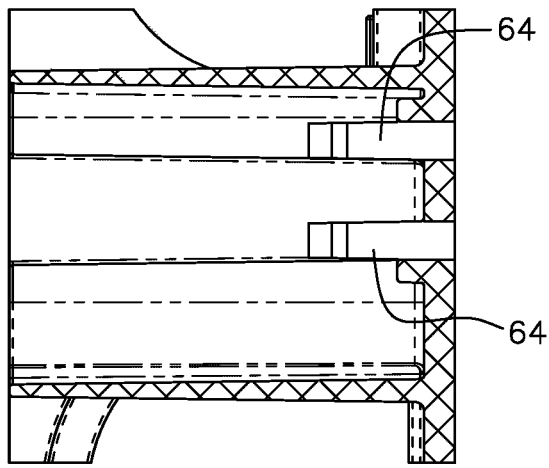
FIG. 3J is a sectional view of the lower housing part taken along line B-B of FIG. 3C.
Figure 3K:
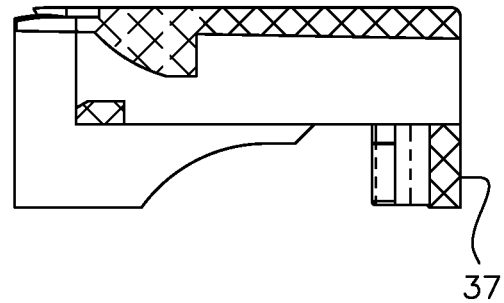
FIG. 3K is a sectional view of the lower housing part taken along line C-C of FIG. 3C.
Figure 3L:
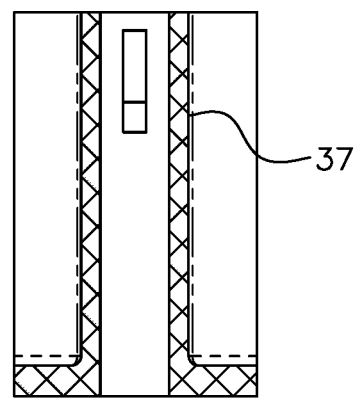
FIG. 3L is a sectional view of the lower housing part taken along line D-D of FIG. 3C.
Figure 4A:
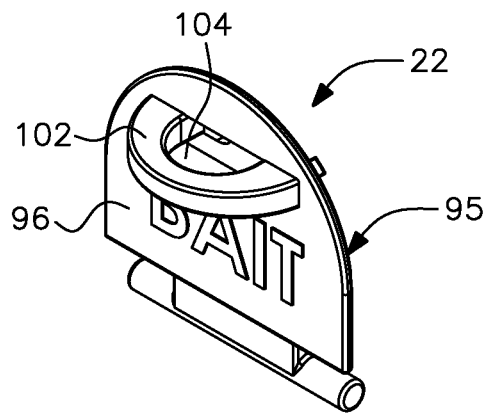
FIG. 4A is a front perspective view of the bait door of the trap shown in FIG. 1.
Figure 4B:
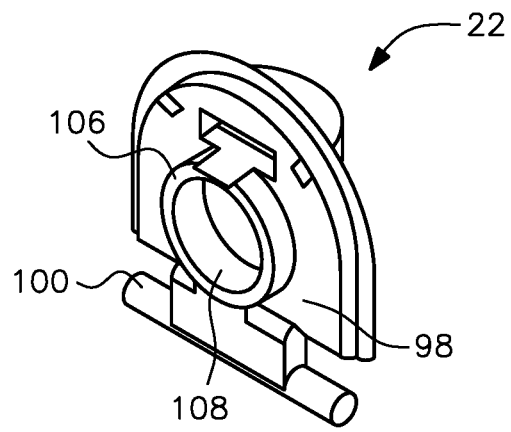
FIG. 4B is a rear perspective view of the bait door shown in FIG. 4A.
Figure 4C:
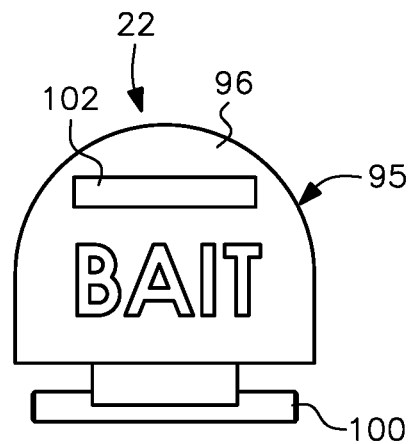
FIG. 4C is a front plan view of the bait door shown in FIG. 4A.
Figure 4D:
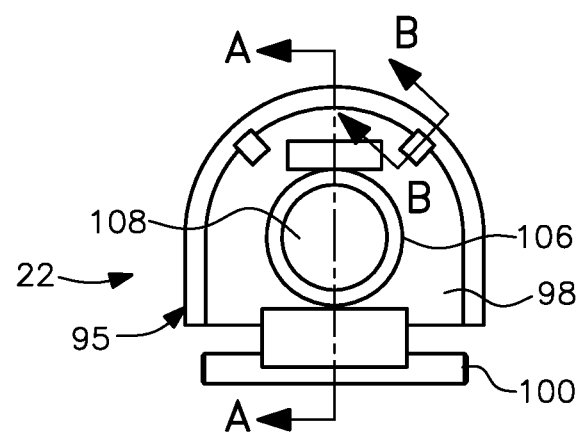
FIG. 4D is a rear plan view of the bait door shown in FIG. 4C.
Figure 4E:
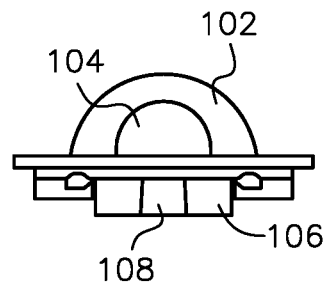
FIG. 4E is a top view of the bait door shown in FIG. 4 D.
Figure 4F:
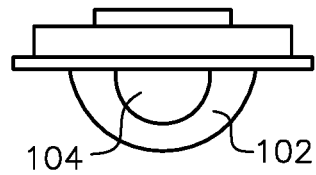
FIG. 4F is a bottom view of the bait door shown in FIG. 4D.
Figure 4G:
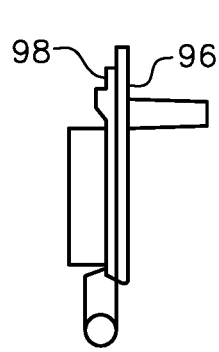
FIG. 4G is a side view of the bait door shown in FIG. 4D.
Figure 4H:
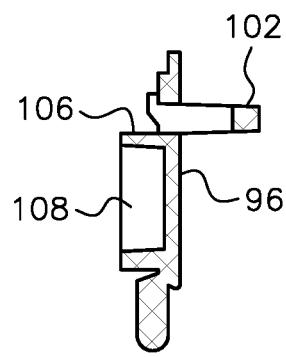
FIG. 4H is a sectional view of the bait door taken along line A-A of FIG. 4D.
Figure 4I:
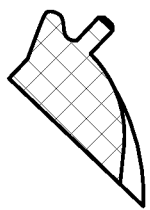
FIG. 4I is a sectional, view of the bait door taken along line B-B of FIG. 4D.
Figure 5A:
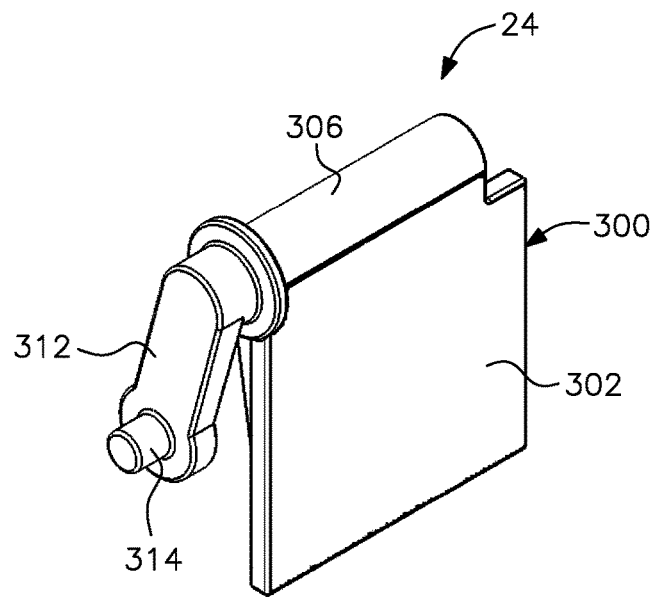
FIG. 5A is a front perspective view of the entrance door assembly of the trap shown in FIG. 1.
Figure 5B:
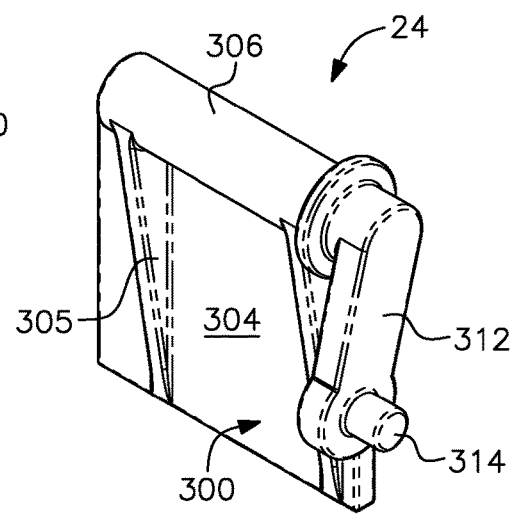
FIG. 5B is a rear perspective view of the entrance door assembly shown in FIG. 5A.
Figure 5C:
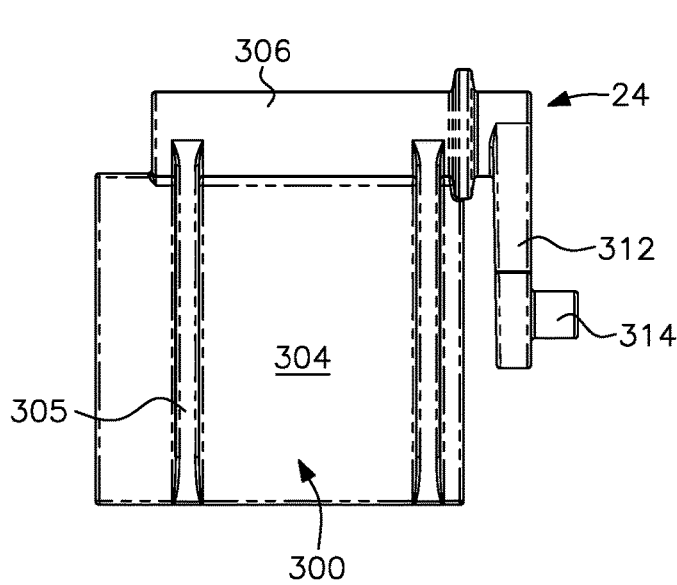
FIG. 5C is a rear plan view of the entrance door assembly shown in FIG. 5B.
Figure 5D:
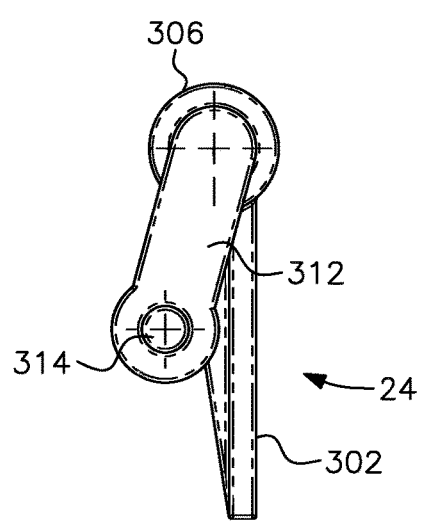
FIG. 5D shows, with the front of the trap as the reference, a view of the left side of the entrance door assembly shown in FIG. 5C.
Figure 5E:
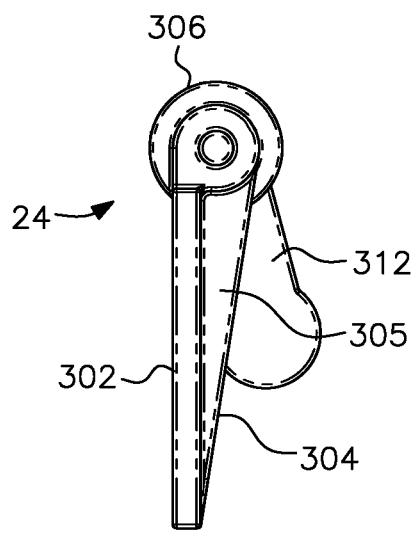
FIG. 5E shows, with the front of the trap as the reference, a right side view of the entrance door assembly shown in FIG. 5C.
Figure 5F:
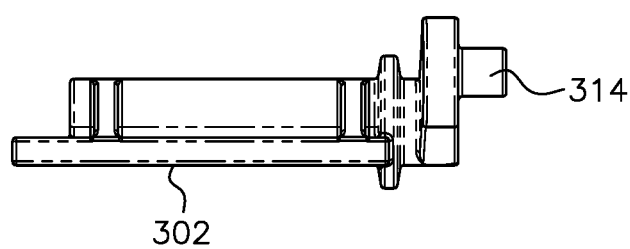
FIG. 5F is a bottom view of the entrance door assembly shown in FIG. 5C.
Figure 5G:
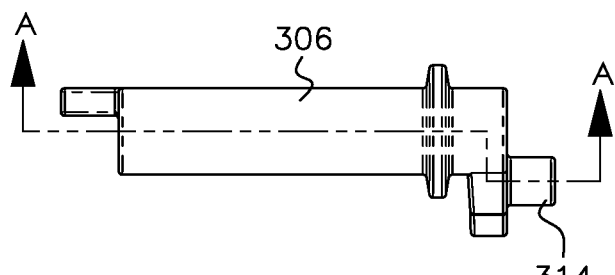
FIG. 5G is a top view of the entrance door assembly shown in FIG. 5C.
Figure 5H:
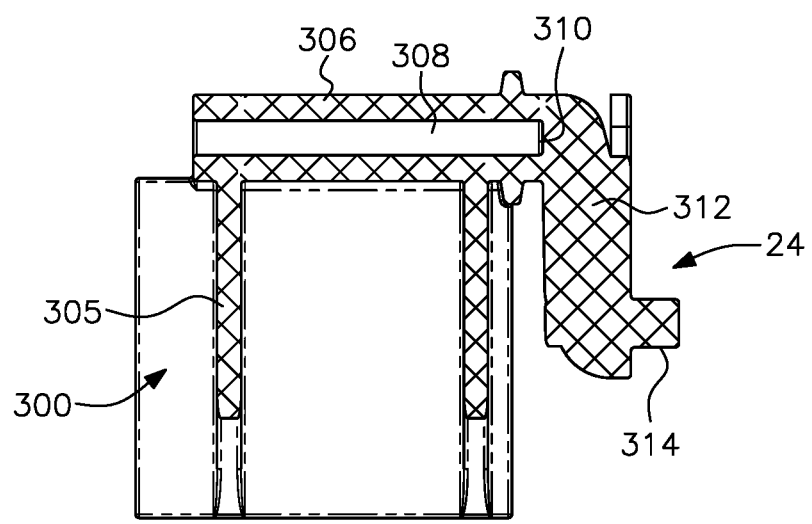
FIG. 5H is a sectional view taken along line A-A of FIG. 5G.

Two base flanges 92 project rearwardly from the bottom of the inner surface of the front panel, one on either side of the bait door aperture as best seen in FIGS. 3C and 3M. Each base flange 92 defines a slot 94 with the slots being transversely aligned with one another for pivotally mounting the bait door 22.

A support member 322 is formed adjacent the entrance opening 46 and includes a door pin aperture 321 to support a free end of the door pin and a door spring aperture 323 to receive one end of the door spring as will be described further hereinafter. Connecting structures 41 are provided on the rear edges of the side walls 38 for attachment of the disposal door 16.

The central dividing structure 50 is defined by two generally parallel walls including a left wall 52 and a right wall 54 that extend rearwardly from the front panel 36. The central dividing structure walls 52, 54 are generally centrally positioned between the side walls 38 of the lower housing part 20 and are spaced from one another to define an inner channel 56. The rear end of the central dividing structure has an enlarged portion 58 with preferably a curved rear wall 60 that is spaced away from the rearmost edge 42 of the floor. The right wall 54 of the central dividing structure 50 has a curved or generally U-shaped cutout 53 formed in an upper edge thereof to accommodate the arm of the entrance door assembly 24 (see FIGS. 3C and 3P) as will be described further hereinafter. In addition, the walls 52, 54 are separated from the enlarged portion 58 by a gap or slot 55 that accommodates the guillotine peg as will also be described hereinafter.

When the disposal door 16 is in place, the spaces between the walls 52 and 54 of the central dividing structure 50 and each of the side walls 38 and between the enlarged portion 58 of the central member and the disposal door 16 define a curved or U-shaped mouse pathway generally designated by reference numeral 62 that extends first rearwardly from the entrance door opening 46 toward the disposal door 16 at the rear of the trap and then forwardly toward the bait door 22 in the front panel 36. The U-shape of the pathway increases the overall length of the pathway so that the mouse is completely inside the trap before reaching the trip mechanism, ensuring the mouse is fully contained when the entrance door closes while retaining a smaller total footprint.

An upwardly extending clip structure 64 is coupled to or preferably made integrally with the floor in the area surrounded by the enlarged portion 58 of the central dividing structure 50 (see FIGS. 3C, 3I, 3J and 3N). A rear end 400 of the pivoting link element 18 is mounted on the clip structure 64 while the opposite free front end 402 extends forwardly through the inner channel 56 between the central dividing structure walls 52, 54 (see FIGS. 15A-15F). The central dividing structure walls 52, 54 thus form a housing structure for the link element 18 while also providing structural rigidity to the center area of the trap enclosure. The link element 18 and its relationship to other components of the trap will be described later herein.

The bait door 22, shown in various views in FIGS. 4A to 4I, includes a generally planar member, generally designated by reference numeral 95, having a front or outside surface 96 and a rear or inside surface 98 opposite the outside surface 96. The bait door 22 also has outwardly projecting pivot rods 100 along the door lower edge that fit into the slots 94 in the lower housing part and hingedly attach the bait door to the front panel 36 of the lower housing part. The outside surface 96 of the bait door 22 has a handle 102 that projects preferably perpendicular to the planar member 95. In the embodiment shown, the handle has a finger opening 104, by which a user can easily grip the handle and pull outward to open the bait door and place bait in the trap. The inside surface 98 of the door preferably has a raised circular ridge that creates an inwardly projecting collar 106. The collar 106 forms a recess 108 into which the user can place rodent bait.

As shown in FIGS. 5A-5H, the entrance door assembly 24 includes a generally planar member or door generally designated by reference numeral 300 having a front or outside surface 302 and a rear or inside surface 304. Extending along the upper edge of the door 300 is a generally cylindrical part 306 having a longitudinally extending hollow bore 308 with a blind end 310 (see FIG. 5H). The end of the cylindrical part with the blind bore is supported on the U-shaped cutout 53 in the right wall 54 of the central dividing structure 50 and is provided with an arm 312. The arm projects downwardly to be generally perpendicular to the cylindrical part 306 and is offset by an angle of between about 10° and about 20°, and preferably about 15°, from the planar door member 300. The angle allows the arm 312 to be inside the trap enclosure when the entrance door 300 is in both the open and closed positions. The distal end of the arm has a link element engaging peg 314 that projects outwardly in an opposite direction from the cylindrical part 306 but generally parallel therewith.

Figure 6:
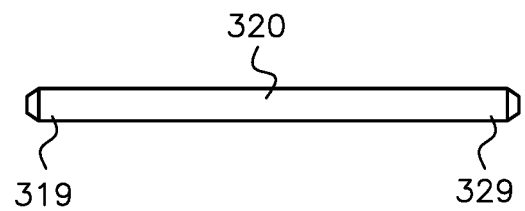
FIG. 6 is a side view of the door pin used with the entrance door shown in FIGS. 5A-5G.
Figure 7A:
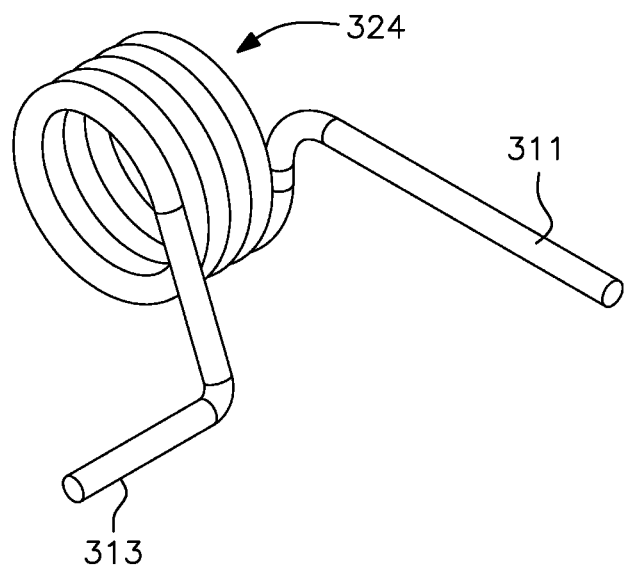
FIG. 7A is a perspective view of the door spring used with the entrance door shown in FIGS. 5A-5G.
Figure 7B:
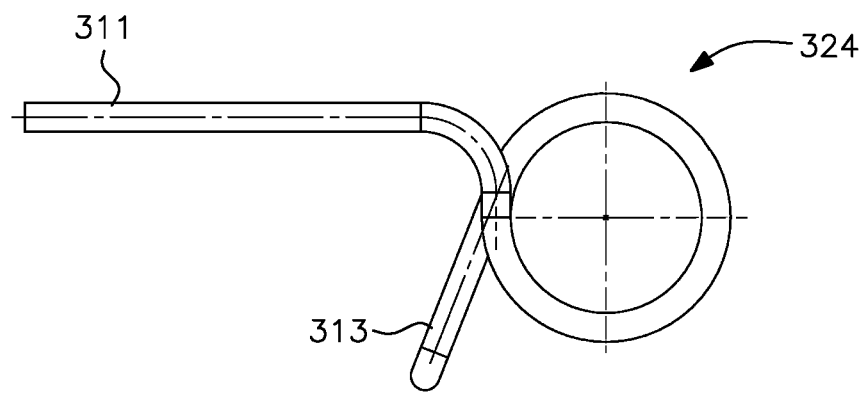
FIG. 7B is a side view of the door spring shown in FIG. 7A.
Figure 7C:
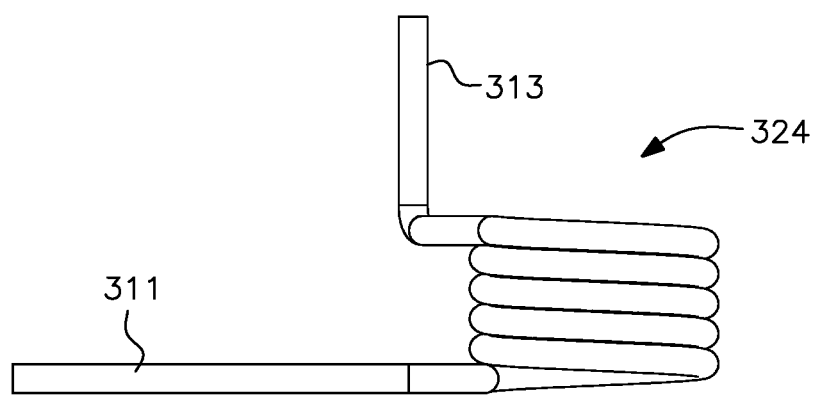
FIG. 7C is a top view of the door spring shown in FIG. 7A.
Figure 7D:
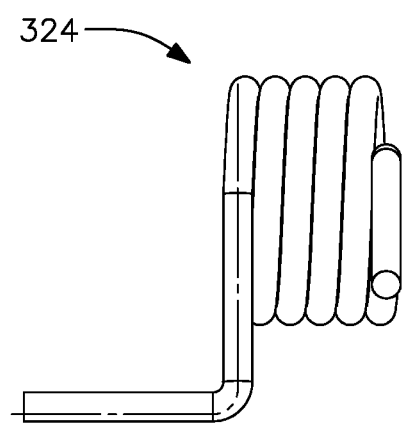
FIG. 7D is another view of the door spring shown in FIG. 7A.

The door 300 of the entrance door assembly 24 is pivotally mounted inside the entrance opening 46 by a door pin 320, shown in FIG. 6, to move between an open position that allows a rodent to access the interior of the trap and a closed position that fully blocks the entrance opening to prevent both entry to and exit from the trap. One end 319 of the door pin 320 extends into the blind end 310 of the bore 308 and the opposite "free" end 329 extends out of the bore and is secured in the door pin aperture 321 in the support member 322 (see FIGS. 2A, 3A and 3G). The door 300 is preferably reinforced by vertical tapering gussets 305 molded on the inner surface 304.

A door spring 324, shown in FIGS. 2A and 7A-7D, is placed on the door pin 320 before the door pin free end 329 is secured in the door pin aperture 321. The door spring 324 is a coil spring with an angled lead on each side. The longer lead end 311 rests on the inside surface 304 of the door 300 and the shorter lead end 313 is secured in the door spring aperture 323 in the support structure 322. The door spring 324 is compressed when the entrance door is in the opened position to bias the entrance door to the closed position.

The pivoting link element 18, while part of the bottom assembly, will be described later herein in connection with FIGS. 15A-15C.

Figure 9A:
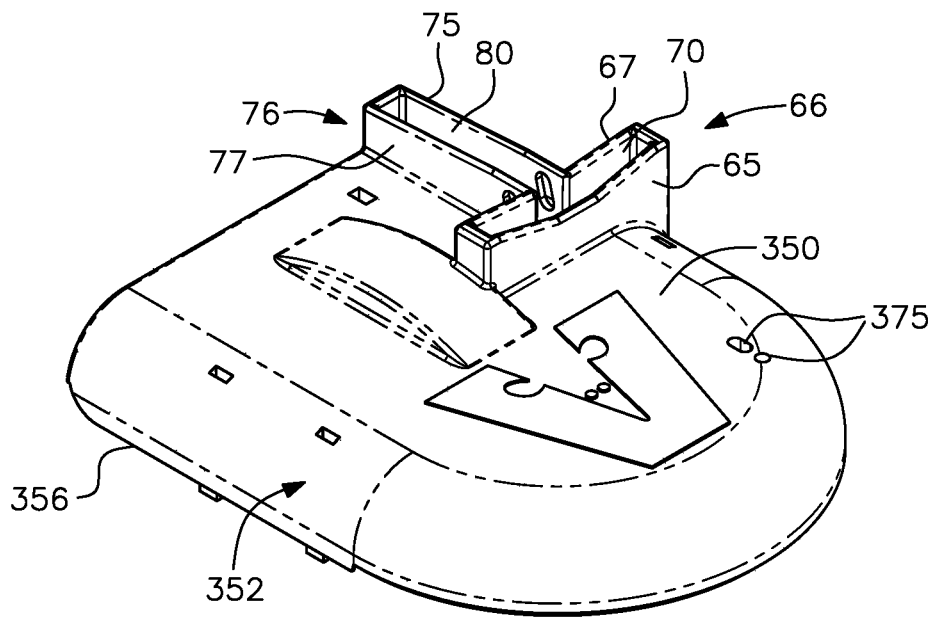
FIG. 9A is an upper perspective view of the upper housing part of the top assembly shown in FIGS. 8A-8C.

The top assembly 14 including the upper housing part 30 the trigger mechanism 32, and the killing mechanism 34 is shown in FIGS. 8A-8C. Various views of the upper housing part are shown in isolation in FIGS. 9A-9N. The trigger mechanism includes a trip pedal generally designated by reference numeral 140 and illustrated in isolation in FIGS. 10A-10C, a catch generally designated by reference numeral 144 and illustrated in isolation in FIGS. 11A-11E, and a hold down component generally designated by reference numeral 146 and illustrated in isolation in FIGS. 12A-12G. Various views of the catch and hold down component prior to assembly are provided in FIGS. 12H-12J, and FIGS. 12K-12N illustrate front, rear, top and sectional views, respectively, of the catch, hold down component and trip pedal as assembled. The killing mechanism includes a guillotine 340 shown in FIGS. 13A-13H, and a guillotine spring 342 shown in FIGS. 14A-14B.

Figure 9B:
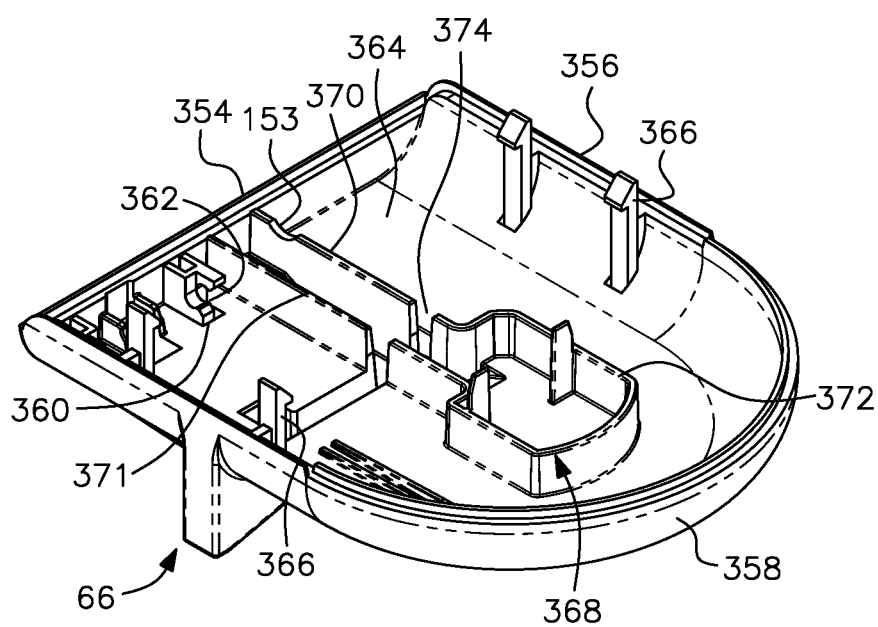
FIG. 9B is a perspective view of the under side of the upper housing part shown in FIG. 9A.
Figure 9C:
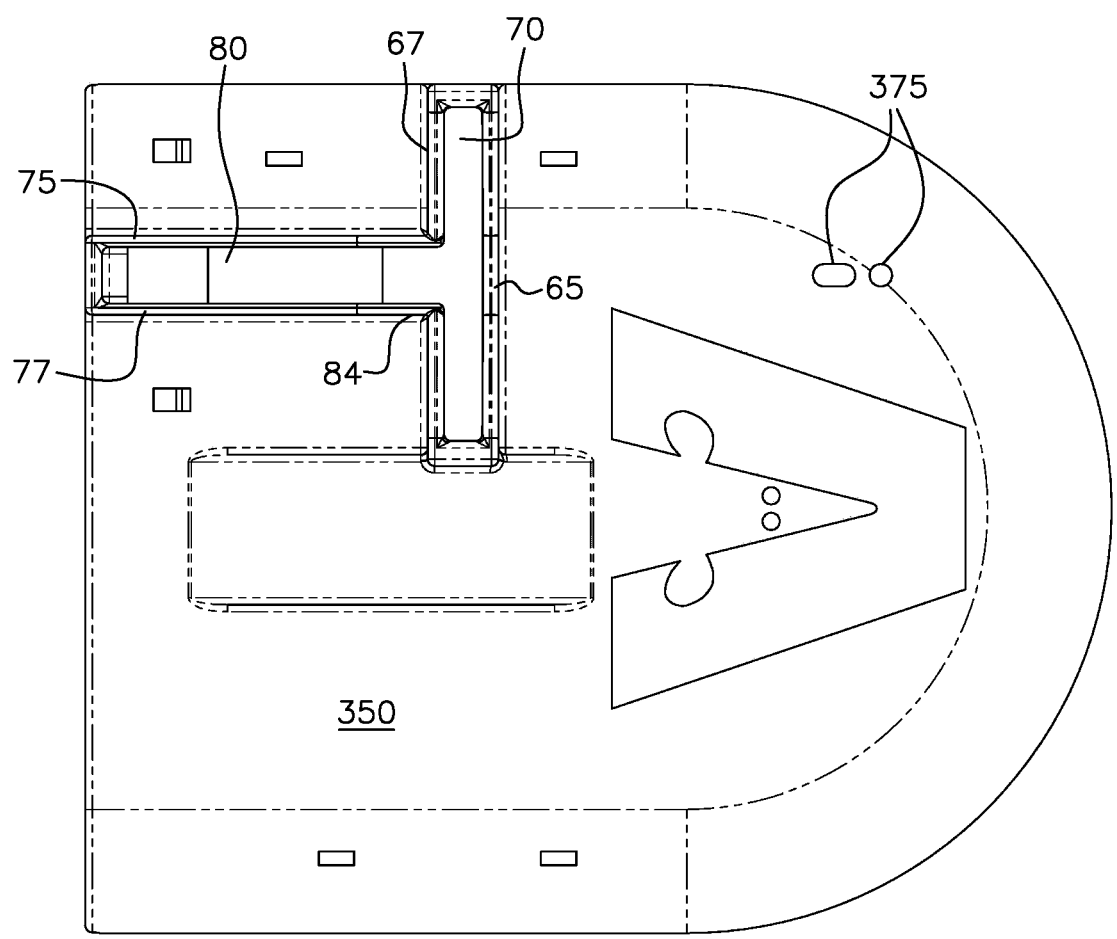
FIG. 9C is a plan view of the upper side of the upper housing part shown in FIG. 9A.
Figure 9D:
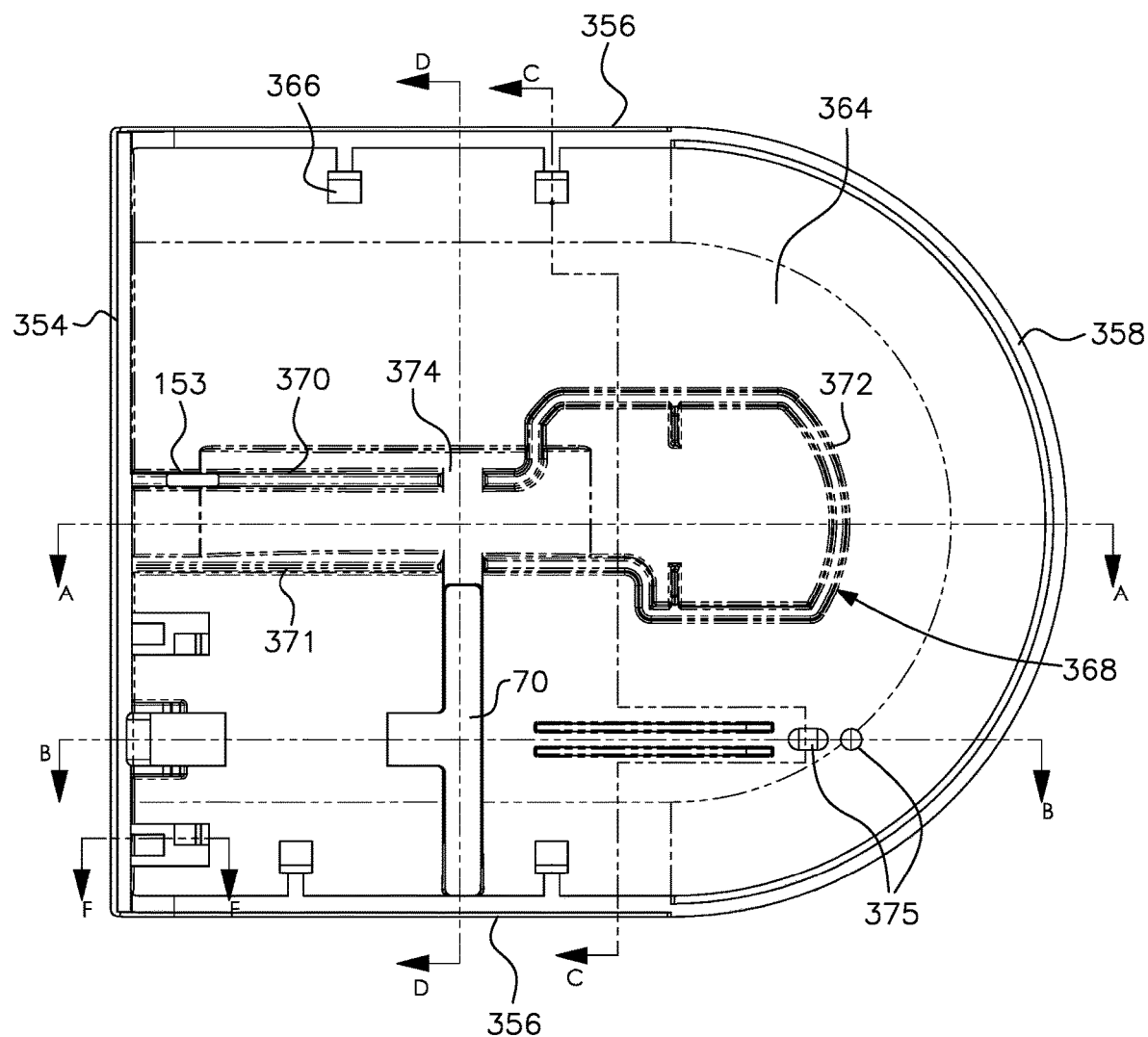
FIG. 9D is a plan view of the under side of the upper housing part shown in FIG. 9B.
Figure 9E:
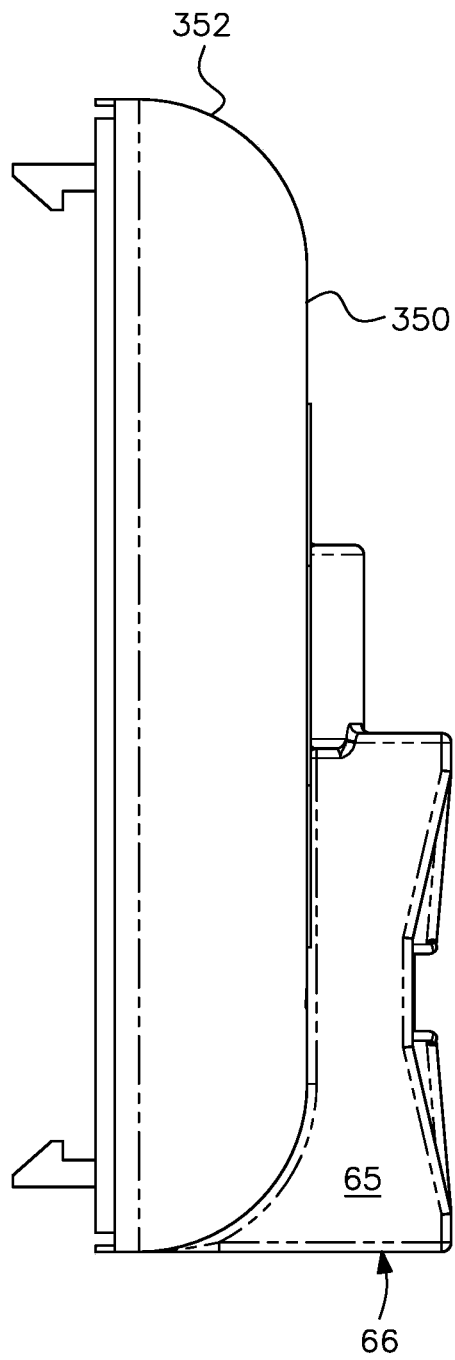
FIG. 9E is a rear view of the upper housing part shown in FIG. 9D.
Figure 9F:
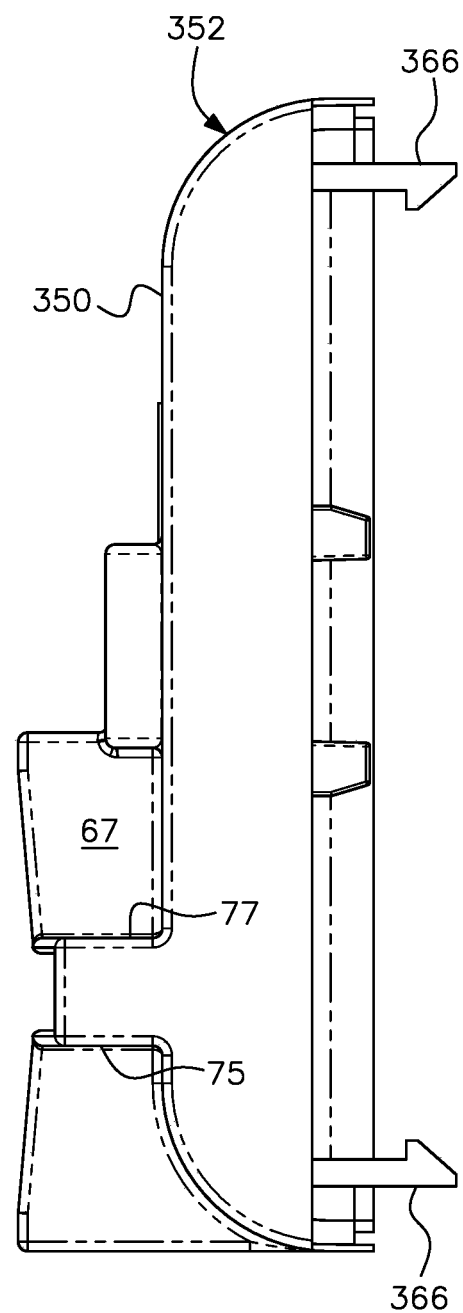
FIG. 9F is a front view of the upper housing part shown in FIG. 9D.
Figure 9G:
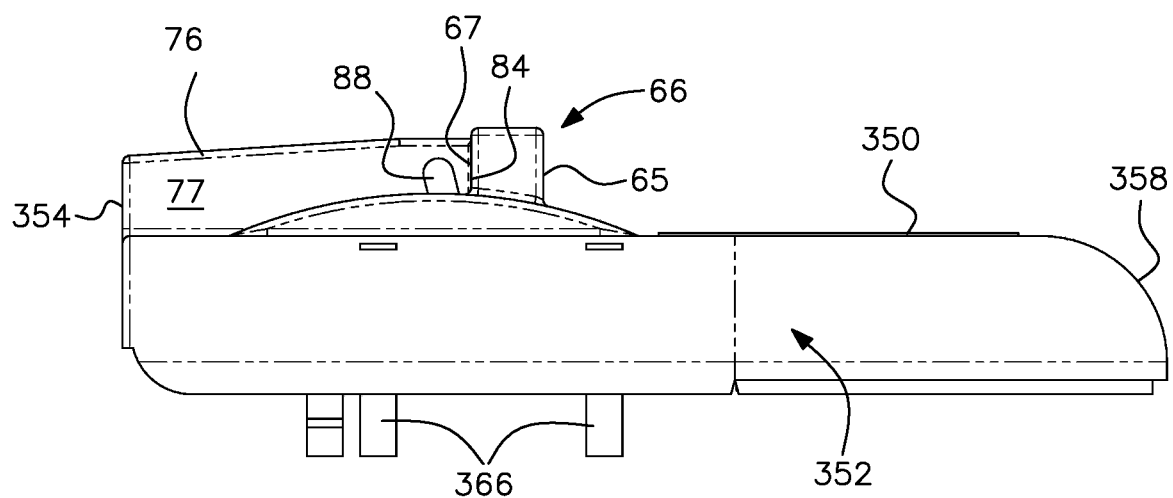
FIG. 9G shows, with the front of the trap as the reference, a left side view of the upper housing part as shown in FIG. 9D.
Figure 9H:
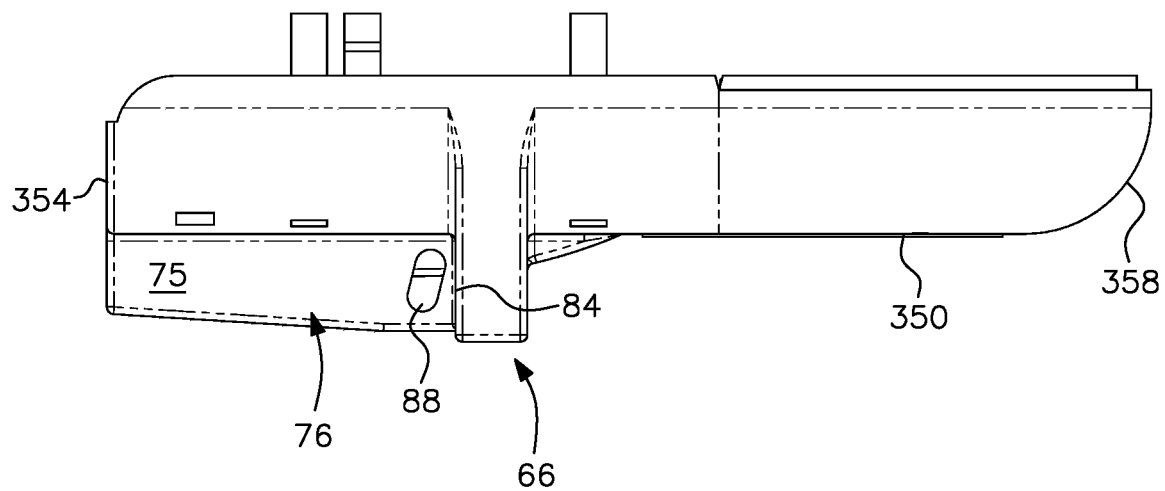
FIG. 9H shows, with the front of the trap as the reference, a right side view of the upper housing part as shown in FIG. 9D.
Figure 9I:
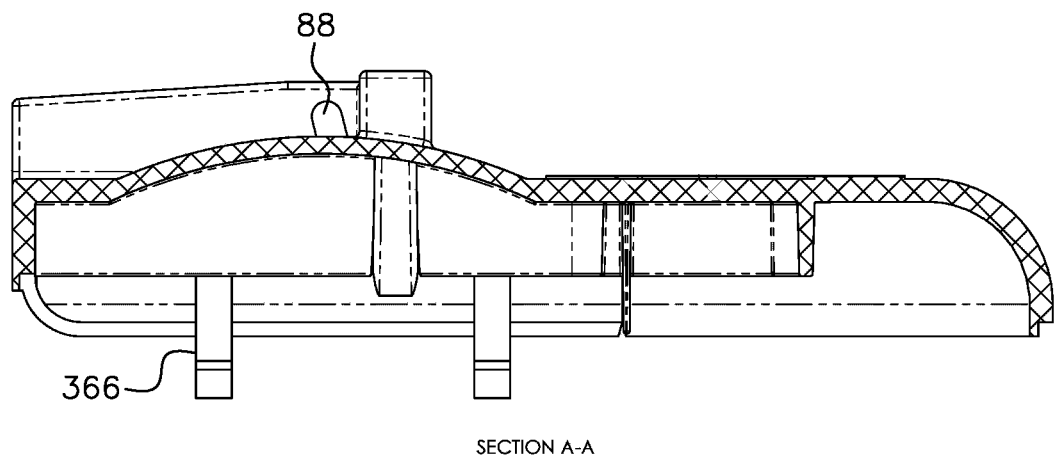
FIG. 9I is a sectional view taken along line A-A of FIG. 9D.
Figure 9J:
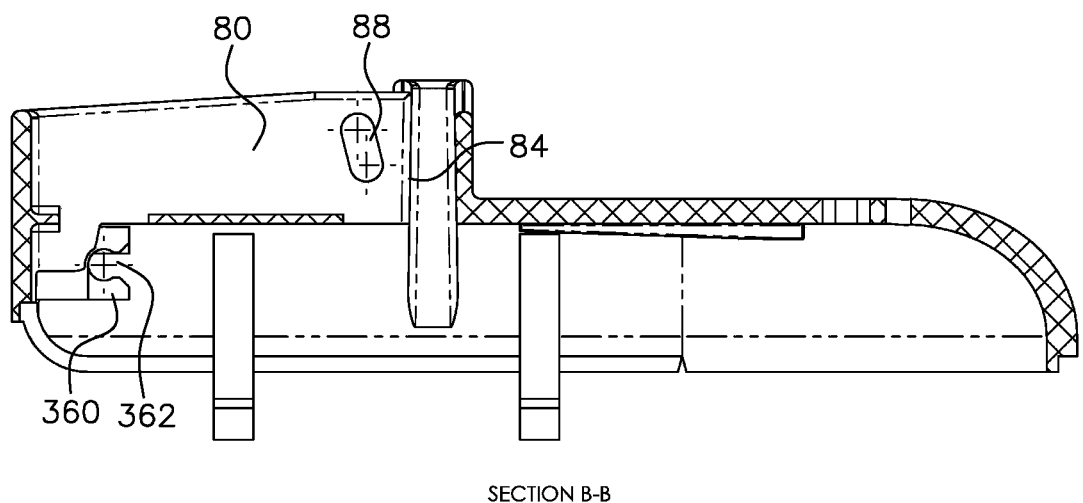
FIG. 9J is a sectional view taken along line B-B of FIG. 9D.
Figure 9M:
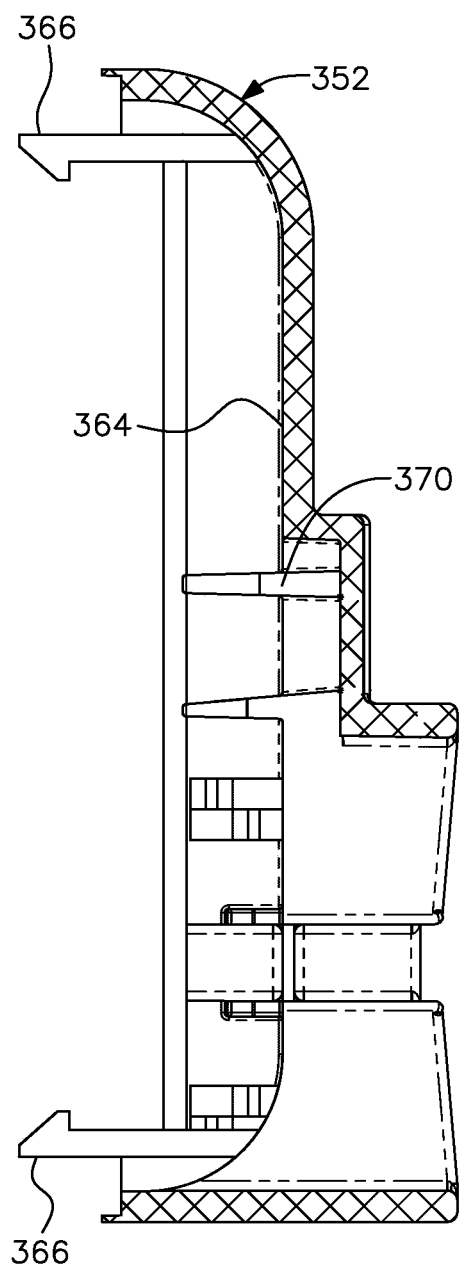
FIG. 9M is a sectional view taken along line D-D of FIG. 9D.
Figure 9N:
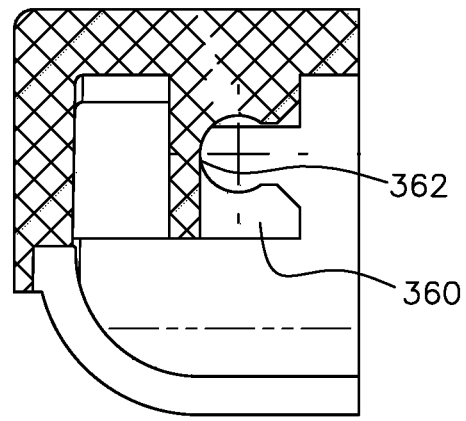
FIG. 9N is a sectional view taken along line F-F of FIG. 9D.

The upper housing part 30 has a generally flat upper surface 350 with sloped side edges generally designated by reference numeral 352. The shape of the perimeter of the upper housing part is complementary to that of the lower housing part 20, having a generally planar front side 354, two rearwardly extending side walls 356 and a curved, generally semicircular rear edge 358. As can be seen in FIGS. 9B and 9J, an arm 360 projects rearwardly into the interior of the trap enclosure from the generally planar front side 354. The rearward end of the arm has a generally C-shaped cutout 362 that is open toward the rear end of the trap and acts as a pivot axis for the trip pedal of the trap as will be described hereinafter.

Figure 17:
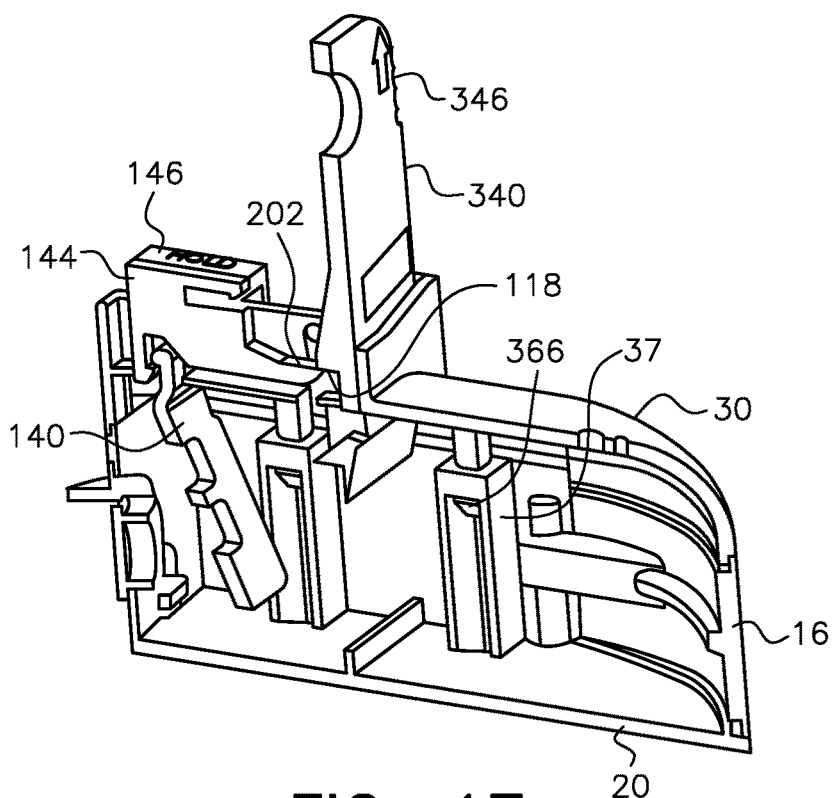
FIG. 17 is a cutaway perspective view of the guillotine in the set position showing the engagement of the catch with the guillotine and with the trip pedal.

The lower surface 364 of the upper housing part includes a pair of downwardly depending coupling members 366 on each side that connect with the support/connecting posts 37 formed on the lower housing part to couple the upper and lower housing parts to one another when the trap is assembled (see FIG. 17). The lower surface 364 is also provided with a downwardly directed wall structure, generally designated by reference numeral 368, that mates with the upper edges of the central dividing structure 50 of the lower housing part.

The downwardly directed wall structure 368 is defined by two generally parallel walls 370, 371 that extend rearwardly from the front side 354 and terminate in an enlarged portion 372. A slot or cutout 374 is formed in the two generally parallel walls 370, 371 to accommodate the guillotine link element engaging peg as will be discussed hereinafter. The left wall 371 of the upper housing part mates with the left wall 52 of the lower housing part 20, the right wall 370 of the upper housing part mates with the right wall 54 of the lower housing part, and the enlarged portion 372 of the upper housing part mates with the enlarged portion 58 of the lower housing part. The right wall 370 has a recess 153 formed therein that aligns with the cutout 53 in the right wall 54 to define a generally cylindrical opening when the trap is assembled through which the cylindrical upper part of the entrance door assembly extends with the arm positioned in the channel 56.

Extending upwardly from the upper surface 350 of the upper housing part are two pairs of substantially parallel walls. The first pair of walls, generally designated by reference numeral 66, is substantially parallel with the front panel and includes a rear wall 65 and a front wall 67 that are spaced from one another to form a guillotine channel 70 therebetween. Accordingly, the first pair of walls 66 are also referred to herein as the guillotine channel walls 66. The top of the guillotine channel 70 is open (see FIG. 9C) for insertion of the guillotine 340 as will be described hereinafter.

The second pair of walls, generally designated by reference numeral 76, are substantially perpendicular to the guillotine channel walls 66 (see in particular FIGS. 9A and 9C) and include a first wall 75 and a second wall 77. Like the guillotine channel walls 66, the second pair of walls 76 are spaced from one another to form a channel 80 therebetween, referred to herein as the trigger channel 80. Accordingly, the second pair of walls are also referred to herein as the trigger channel walls 76. The top of the trigger channel 80 is open (see FIG. 9C) to receive a portion of the trigger mechanism as will be described hereinafter. The rearward edges 84 of the trigger channel walls 76 abut with the front guillotine channel wall 67 (see FIG. 9G). Just forward of the rearward edges 84, each of the trigger channel walls 76 has an aperture 88 formed therein. The two apertures 88 are transversely aligned, and in the embodiment shown, each of the apertures 88 is oblong. The upper ends of the oblong apertures 88 tilt forwardly so that the bottom ends of the oblong apertures are closer to the front guillotine channel wall 67 than the upper ends of the oblong apertures.

As shown in FIGS. 10A-10C, the trip pedal 140 has a substantially planar body, generally designated by reference numeral 148, having a front side 150 and a rear side 152. An upper portion 149 of the body bends rearwardly along a bending line 151 so as to be at an angle with respect to a lower portion 147 of the body 148.

The trip pedal body 148 preferably includes an upper aperture 160 and a lower aperture 162 both of which are generally rectangular. The apertures are provided to enable the mouse to see through the lever body 148 to the bait and therefore may be formed in almost any shape for this purpose.

In alignment with the bending line 151 is a pivot bar 168 that is generally cylindrical in lateral cross-section. The pivot bar 168 is hingedly received within the hinge cutout 362 formed in the rearwardly projecting arm 360 on the front wall 354 of the upper housing part 30, enabling the trip pedal 140 to pivot on the pivot bar 168 in alignment with the bending line 151 (see FIGS. 9J and 9N).

The upper portion 149 of the trip pedal 140 is configured as a head, generally designated by reference numeral 170, which extends above the trip pedal body 148 and has a rounded upper surface 172. The head 170 has a front side with a lip 176 that engages the catch 144 when the trap is set as will be described hereinafter. The trip pedal 140 is positioned proximate to the front panel of the lower housing part when the trap is assembled. When the pivot bar 168 is positioned in the cutout 362, the upper portion 149 is substantially vertical in orientation while the lower portion 147 slopes rearwardly from the pivot bar 168 to the bottom edge 156 (see FIG. 10C). The distance between the bottom edge 156 of the trip pedal body 148 and the guillotine 340, as measured along the longitudinal length of the trap, is preferably between about 0.50 inches and about 0.60 inches, and is about 0.56 inches in a preferred embodiment. This distance, and the confining width of the mouse pathway in the trap enclosure, determines the location and orientation of a rodent relative to the guillotine before the trap is tripped by contact of the rodent with the trip pedal 140. In particular, the noted distance between the bottom edge 156 of the lower portion 147 of the trip pedal body and the guillotine ensures that when the rodent has entered the trap and reached the trip pedal, the position of the rodent will provide for effective placement of the guillotine blow to the rodent.

Various views of the catch 144 are provided in FIGS. 11A-11E. The catch 144 has a generally planar body, generally designated by reference numeral 180, with a rearward end generally designated by reference numeral 182, and a forward end generally designated by reference numeral 184. The front end 184 has a generally flat upper surface 186 and a generally flat lower surface 188. The body 180 has an elongated cutout 181 extending generally parallel with both the upper and lower surfaces 186, 188 that extends to an approximate midpoint between the front edge 183 and the rear edge 185 of the body 180. Extending from the foremost end 179 of the cutout to the front edge 183 is a channel 177 cut into the left side of the catch body 180 (see FIGS. 11B and 11E). The cutout 181 creates an arm 161. The rearwardmost end of the arm 161 has a downwardly directed hook 163.

Figure 11A:
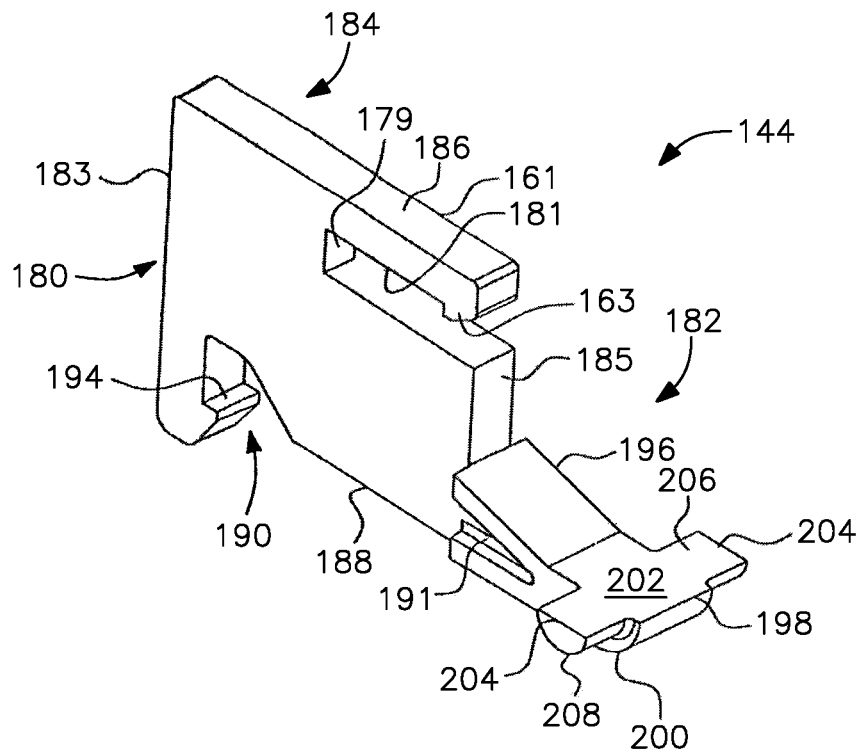
FIG. 11A is a rear perspective view of the catch of the trap shown in FIG. 1.
Figure 11B:
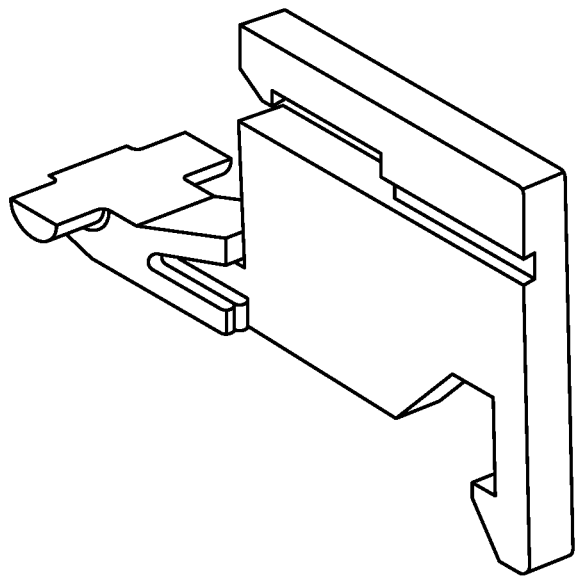
FIG. 11B shows a front perspective view of the catch shown in FIG. 11A.
Figure 11C:
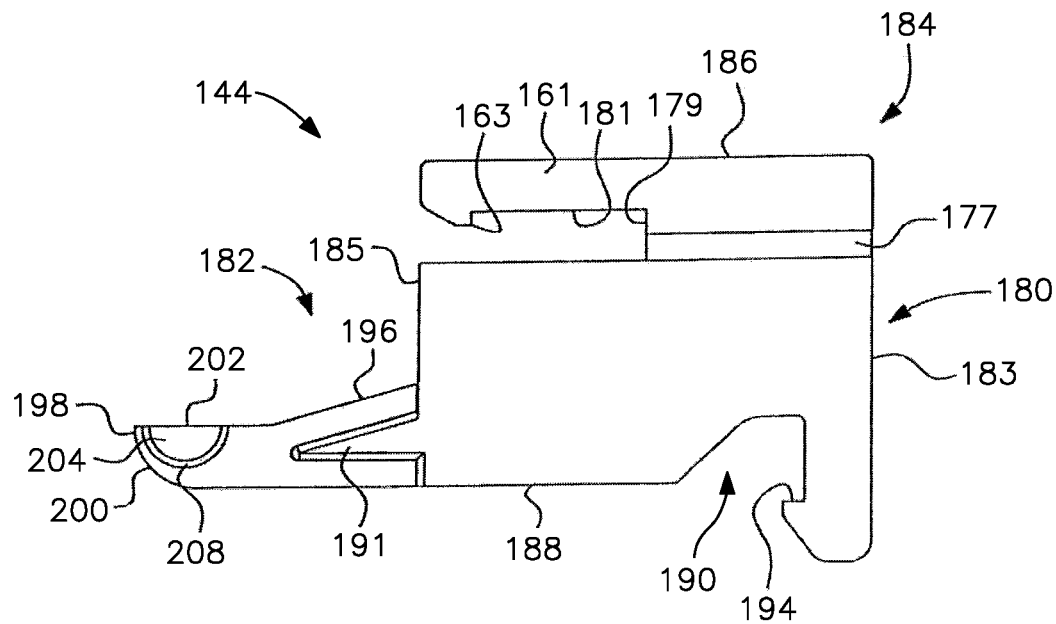
FIG. 11C shows a left side plan view of the catch oriented as shown in FIG. 11B.
Figure 11D:
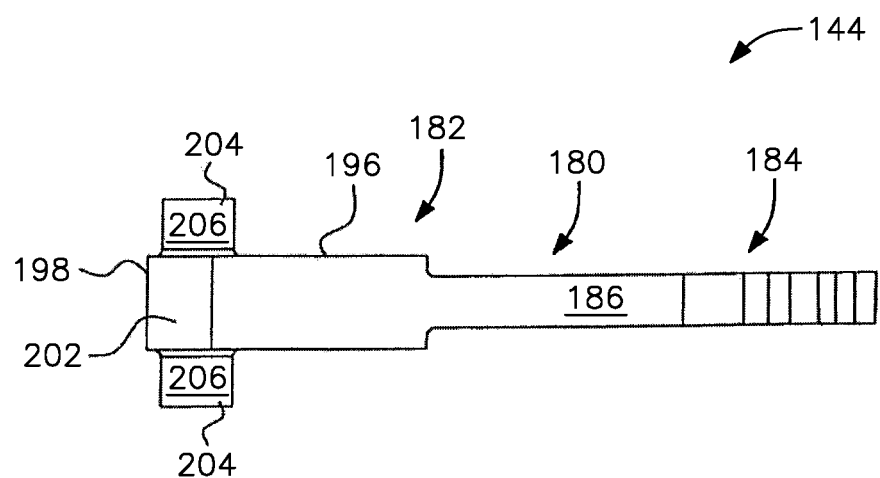
FIG. 11D is a top view of the catch shown in FIG. 11C.
Figure 11E:
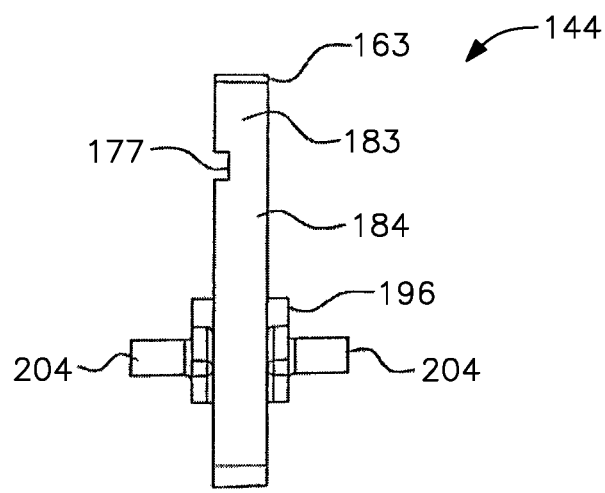
FIG. 11E is a front view of the catch shown in FIG. 11C.
Figure 11F:
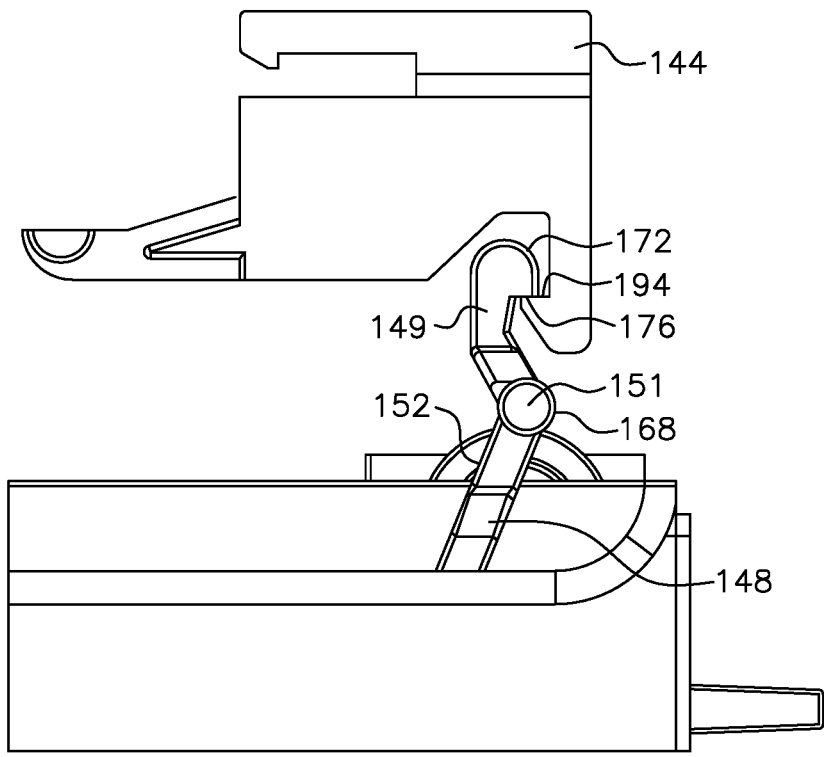
FIG. 11F is a partial side view showing the engagement between the lip of the trip pedal and the catch when the trap is set.

The generally flat lower surface 188 includes an upwardly tapered cutout, generally designated by reference numeral 190. The foremost part of the forward end 184 has a rearwardly facing hook 194 positioned beneath the cutout 190 that engages the lip 176 of the trip pedal head 170 when the trap is set. The pivot axis created by the cutout 362 in the arm 360 is preferably in vertical alignment with, or slightly rearward of, the point of engagement between the lip 176 and the hook 194 as shown in FIG. 11F. This substantially vertical alignment reduces the forces on the lip and hook engagement that would otherwise tend to trip the trap too easily due to the tension on the catch 144 imposed by the guillotine spring 342. A different alignment could be configured during manufacture, however, should it be desired to change the sensitivity of the trap or the force needed to operate the trap.

The rearward end 182 of the catch 144 includes a forwardly extending arm 196. As shown in FIG. 11D, the arm 196 has a lateral thickness greater than that of the body 180 of the catch. This additional thickness locates and guides the catch within the trigger channel 80. In the embodiment shown, each side of the arm 196 has a cutout 191 that assists during manufacture of the catch which is preferably molded. The cutouts 191 are not necessary, however.

The rearwardmost tip 198 of the arm 196 has an upwardly curved bottom surface 200 and a flat upper setting platform 202. The curved bottom surface 200 allows the trap to be easily set. Just forwardly of the rearward tip 198, the arm 196 has lateral projections 204 on either side that extend generally perpendicularly to the planar sides of the trip pedal. The lateral projections 204 are received within the oblong apertures 88 formed in the trigger channel walls 76. As shown in FIGS. 11A-11C, the upper surfaces 206 of the projections 204 are generally flat and the bottom surfaces 208 thereof are rounded. The rounded shaping of the bottom surfaces 208 allows the catch to rotate when the trap is triggered.

The hold down component 146 has an inverted U-shaped portion generally designated by reference numeral 210 with a generally flat top 212 partially divided along a center line of the top by a channel 201 to form a first side 187 and a second side 189 (see FIGS. 12A-12G). The first side 187 has an inwardly directed lip 209 that extends longitudinally along the edge of the channel 201. The hold down component also includes left and right generally vertical side walls 214a and 214b, a downwardly directed left arm 216a extending from the bottom of the left side wall 214a that is curved to fit against the sloped side edge of the upper housing part, and a right arm 216b that extends generally perpendicular to the right side wall 214b (see FIGS. 12A-12C).

Figure 12A:
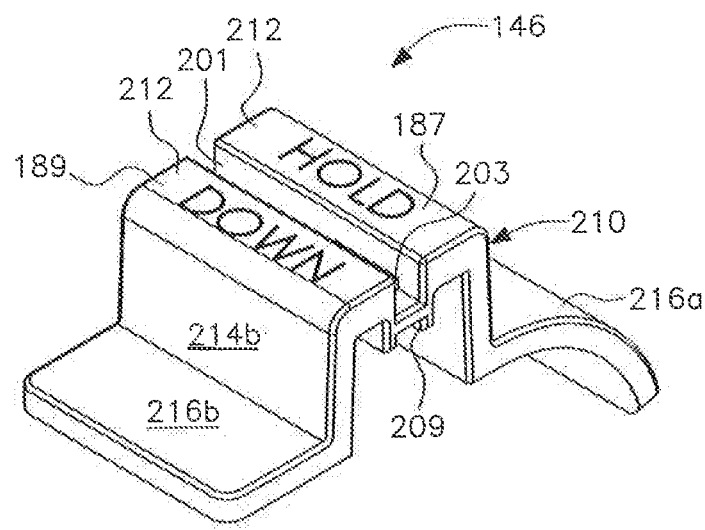
FIG. 12A is an upper rear perspective view of the hold down component of the trap shown in FIG. 1.
Figure 12B:
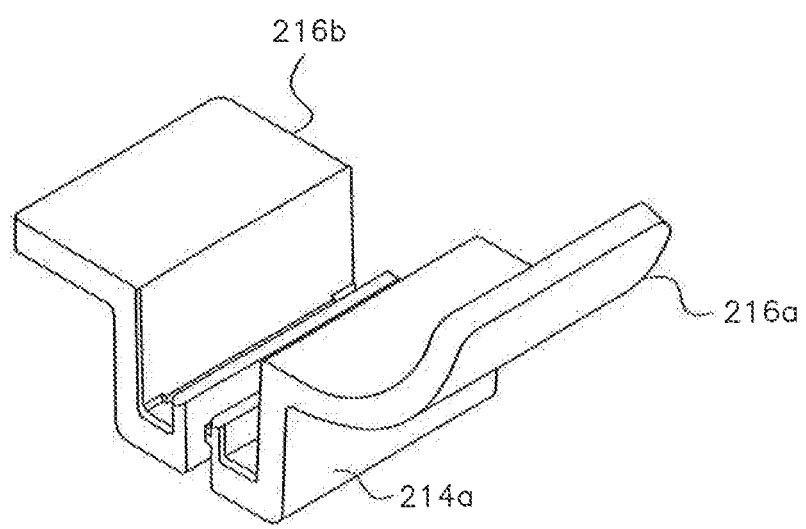
FIG. 12B is a rear perspective view of the under side of the hold down component shown in FIG. 12A.
Figure 12C:
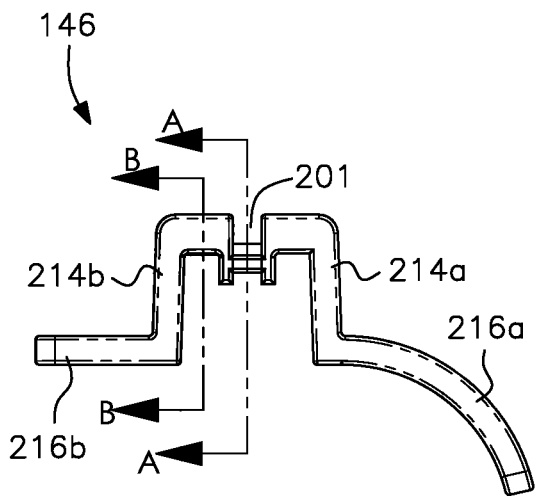
FIG. 12C is a rear end view of the hold down component shown in FIG. 12A.
Figure 12D:
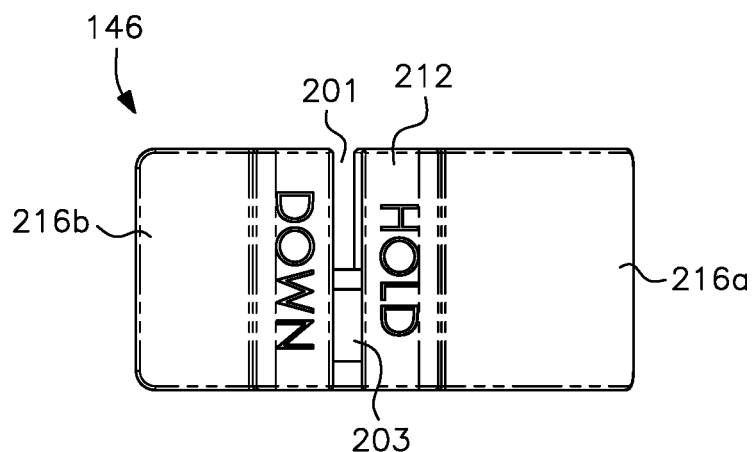
FIG. 12D is a top view of the hold down component shown in FIG. 12C.
Figure 12E:
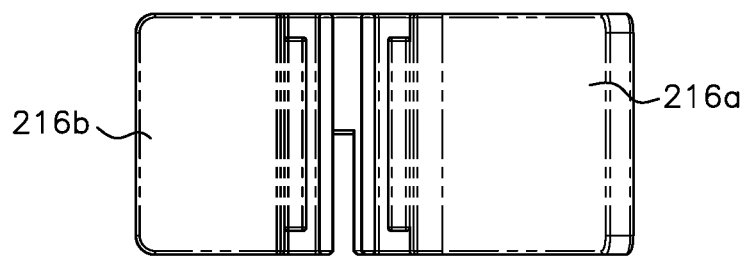
FIG. 12E is a bottom view of the hold down component shown in FIG. 12C.
Figure 12I:
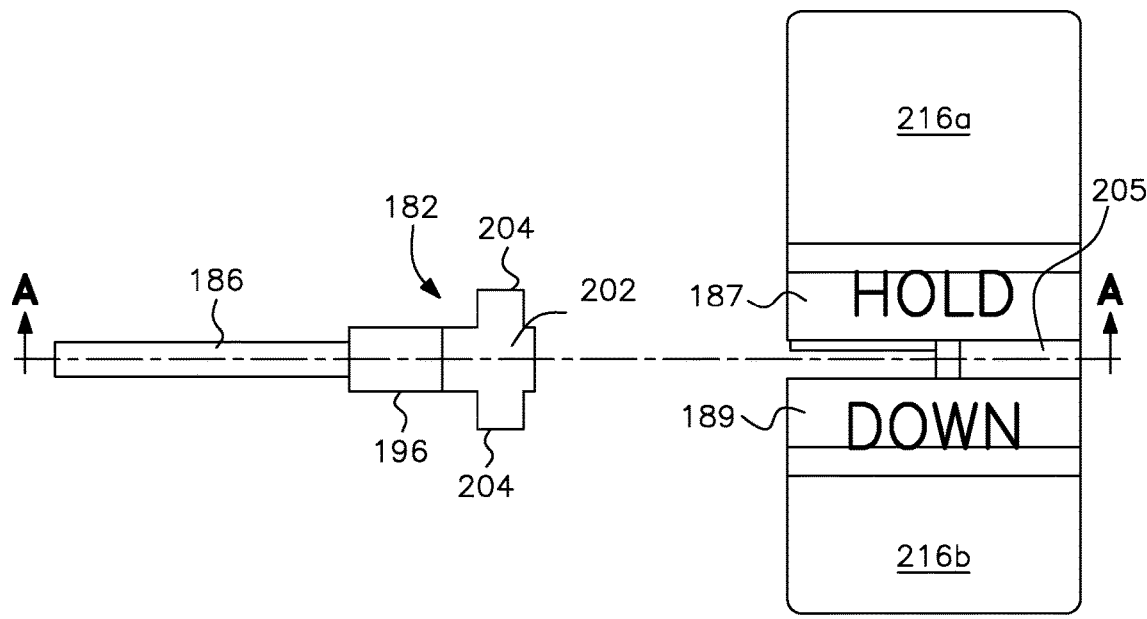
FIG. 12I is a top view of the catch and hold down component as shown in FIG. 12H.
Figure 12J:
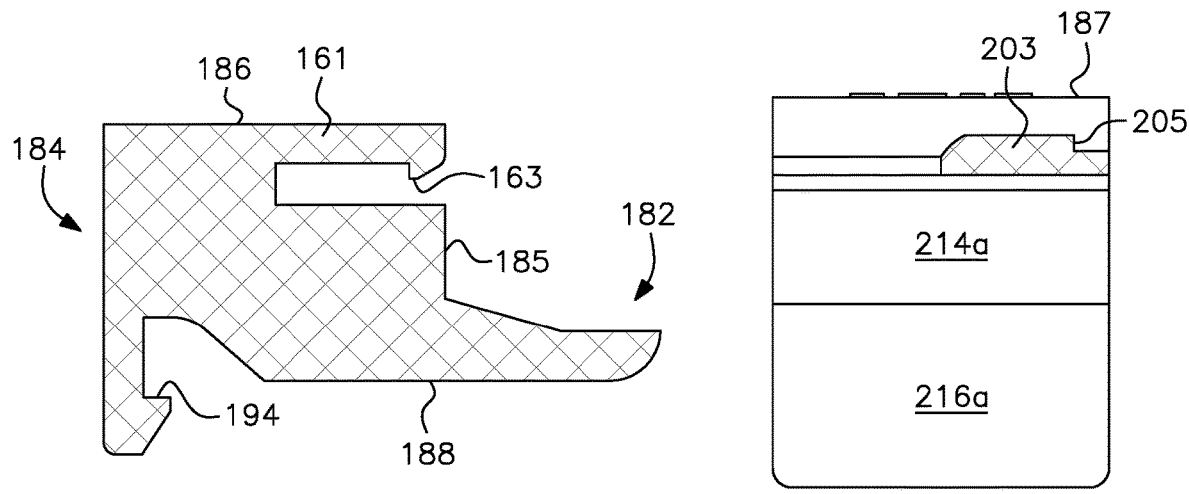
FIG. 12J is a sectional view of the catch and hold down component taken along line A-A of FIG. 12I.
Figure 12K:
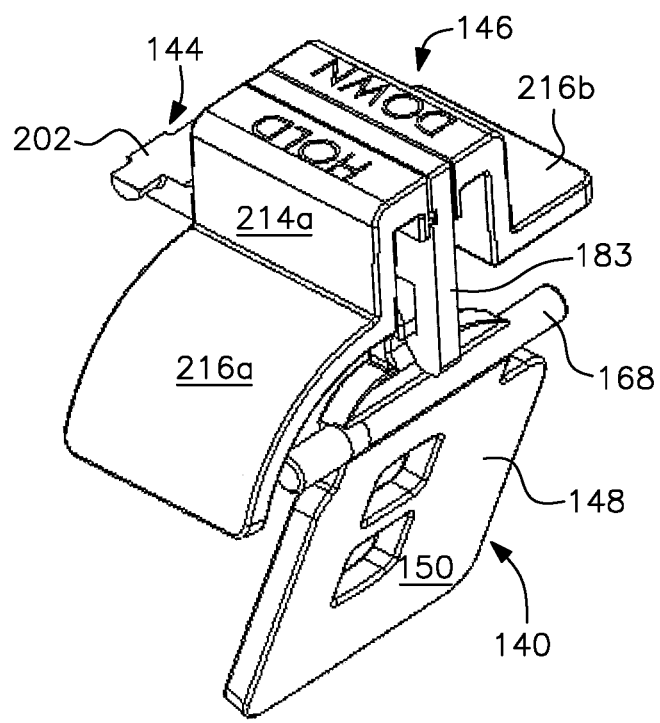
FIG. 12K is an upper front perspective view of the catch, hold down component and trip pedal as assembled.
Figure 12L:
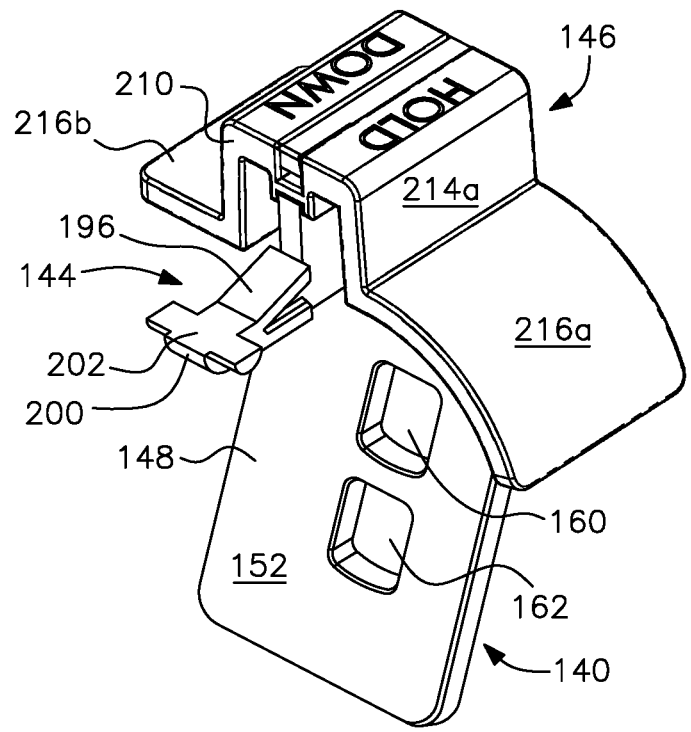
FIG. 12L is an upper rear perspective view of the assembly shown in FIG. 12K.
Figure 12M:
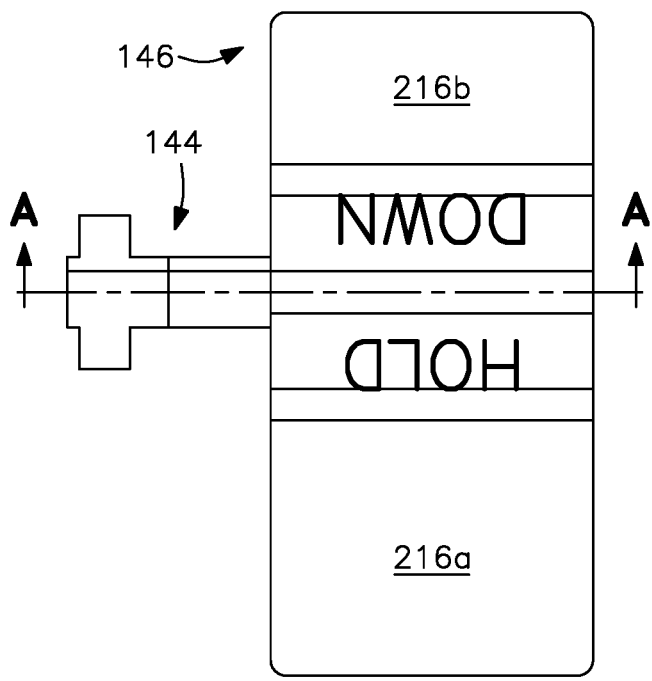
FIG. 12M is a top view of the assembly shown in FIGS. 12K and 12L.
Figure 12N:
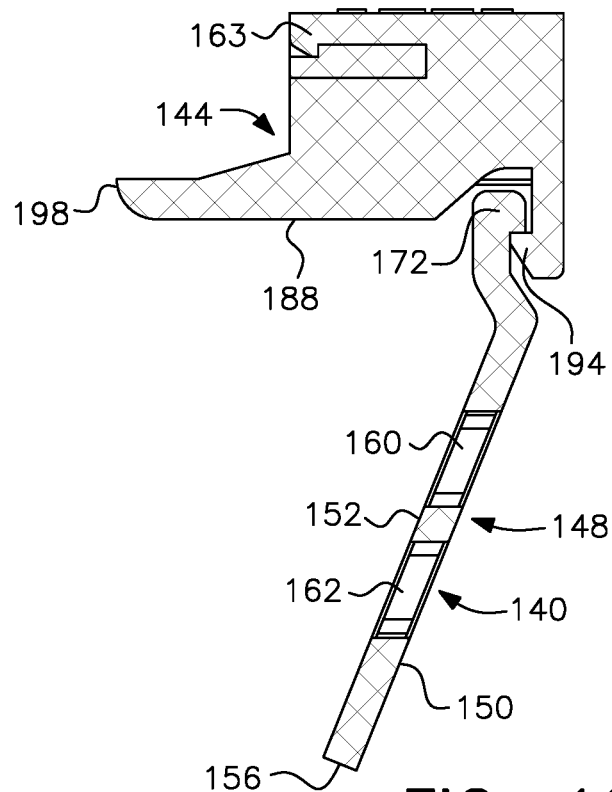
FIG. 12N is a sectional view taken along line A-A of FIG. 12M.
Figure 13A:
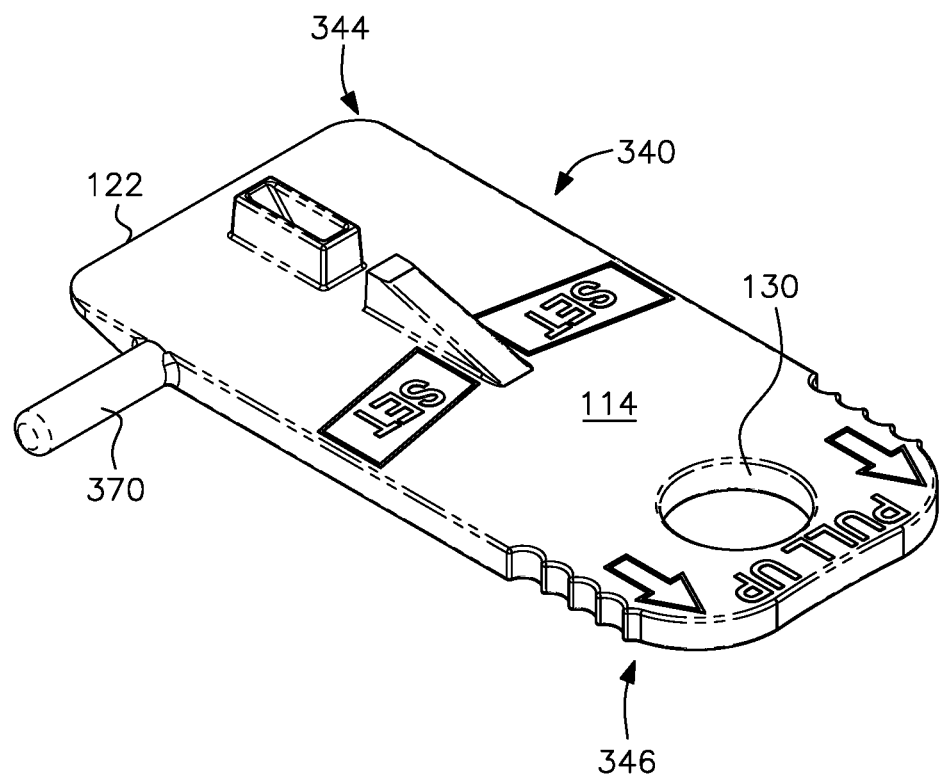
FIG. 13A is a rear side perspective view of the guillotine of the trap shown in FIG. 1.
Figure 13B:
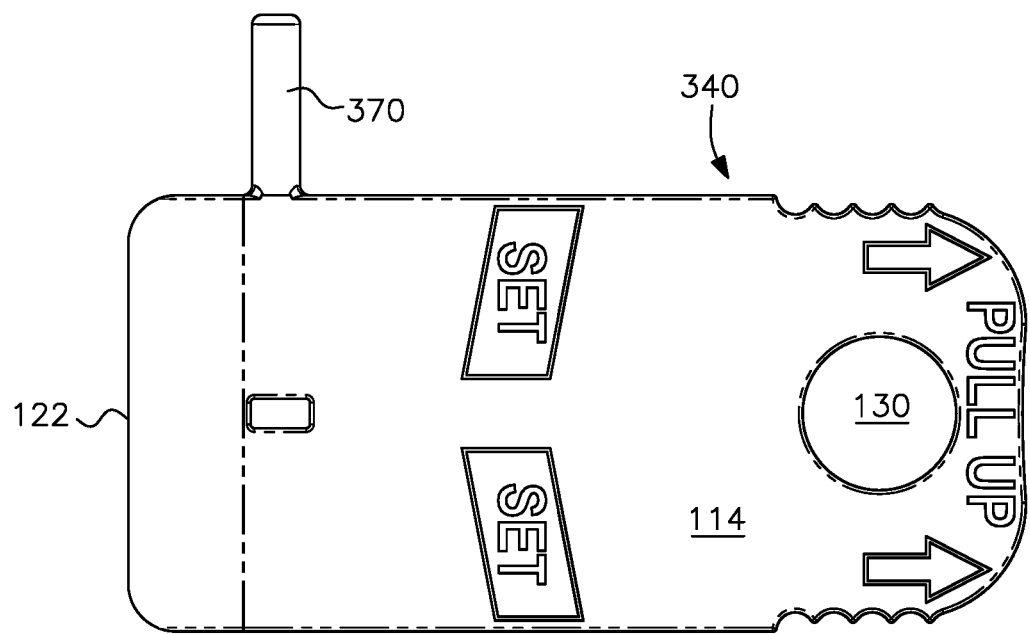
FIG. 13B is a plan view of the rear side of the guillotine shown in FIG. 13A.
Figure 13C:
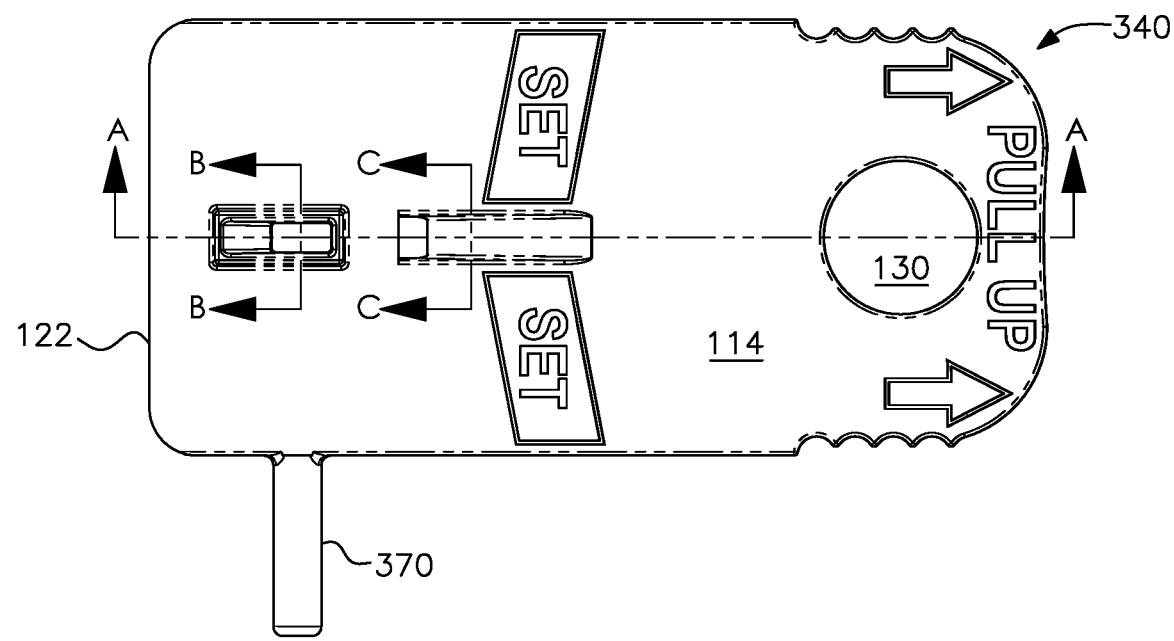
FIG. 13C is a plan view of the front side of the guillotine shown in FIG. 13A.
Figure 13D:
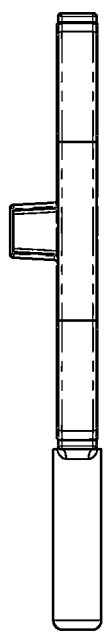
FIG. 13D is a top view of the guillotine shown in FIG. 13C.
Figure 13E:
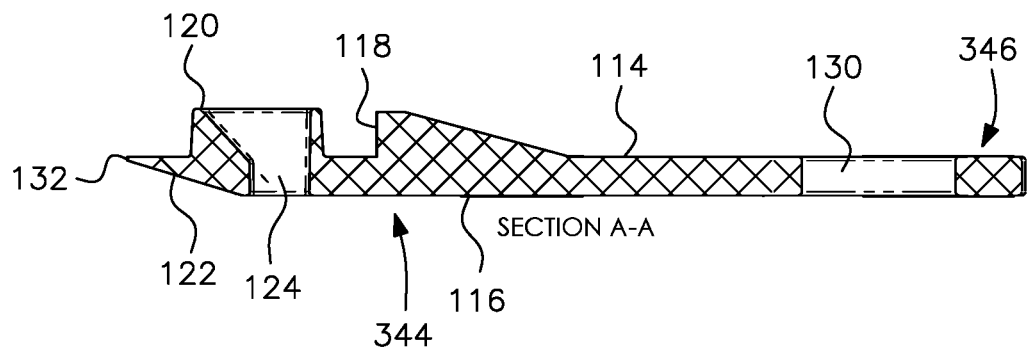
FIG. 13E is a sectional view taken along line A-A of FIG. 13C.
Figure 13F:
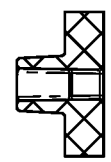
FIG. 13F is a sectional view taken along line B-B of FIG. 13C.
Figure 13G:
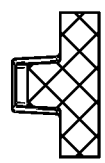
FIG. 13G is a sectional view taken along line C-C of FIG. 13C.
Figure 13H:
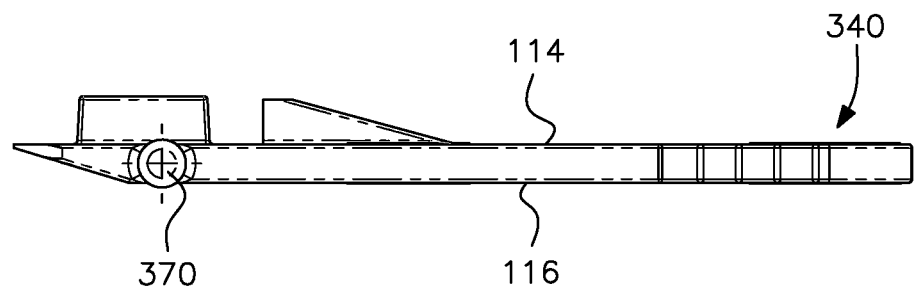
FIG. 13H is a side view of the guillotine shown in FIG. 13C.

The forward end of the hold down component 146 includes a bridge 203 that joins the first side 187 and the second side 189 to one another (see FIG. 12D). The forward end of the bridge 203 includes a ledge 205 (see FIG. 12F). To join the catch and the hold down component, the arm 161 of the main body 180 of the catch 144 is received within the channel 201 while the lip 209 is inserted into the channel 177 in the side of the catch. When the catch is fully mounted, the hook 163 engages the ledge 205 of the bridge 203 to secure the catch 184 to the hold down component 146.

Additional views of the hold down component, catch and trip pedal, illustrating the relationship of these components for assembly and as assembled, are provided in FIGS. 12H-12N.

Turning to FIGS. 13A-13F, the guillotine 340 is a thin substantially planar element that is received within the guillotine channel 70 of the upper housing part. The guillotine 340 includes a front surface 114 and a rear surface 116. As shown in the FIG. 13H side view, the rear surface 116 of the guillotine is substantially flat while the front surface 114 includes a forward facing setting ledge 118 and a forwardly projecting boss 120 located proximate to the bottom end 122 of the guillotine. The boss 120 forms a small channel 124 proximate to the bottom end 122 of the guillotine that is open on the rear surface of the guillotine 340 which accepts one end of the guillotine spring 342. The setting ledge 118 and the boss 120 with associated channel 124 work cooperatively with the trigger mechanism to set the guillotine 340 in a raised position, thereby setting the mouse trap as will be explained hereinafter.

The guillotine 340 is oriented to be substantially perpendicular to the floor of the lower housing part and includes a lower part, generally designated by reference numeral 344, that extends into the trap enclosure and an upper part, generally designated by reference numeral 346, that projects above and outside the trap enclosure. The lower part 344 is provided with a link element engaging peg 370 and the upper part is configured to be grasped by the user to pull the guillotine up and set the trap. In the embodiment shown, the upper part 346 has a circular aperture 130 that enables a user to better grip the guillotine between his or her thumb and forefinger and pull up on the guillotine to set the trap. When the trap is set, the guillotine engages with the catch, with the catch then holding the guillotine in a raised position above the floor (see FIGS. 17 and 18). The bottom of the guillotine is tapered to a sharp knife-like edge 132 for killing a mouse when the trap is tripped.

The guillotine spring 342 is operatively coupled between the upper housing part and the guillotine and biases the guillotine to move rapidly to a lowered position adjacent the floor of the lower housing part when the guillotine becomes disengaged from the catch through movement of the trip pedal by a rodent inside the trap enclosure.

Figure 14A:
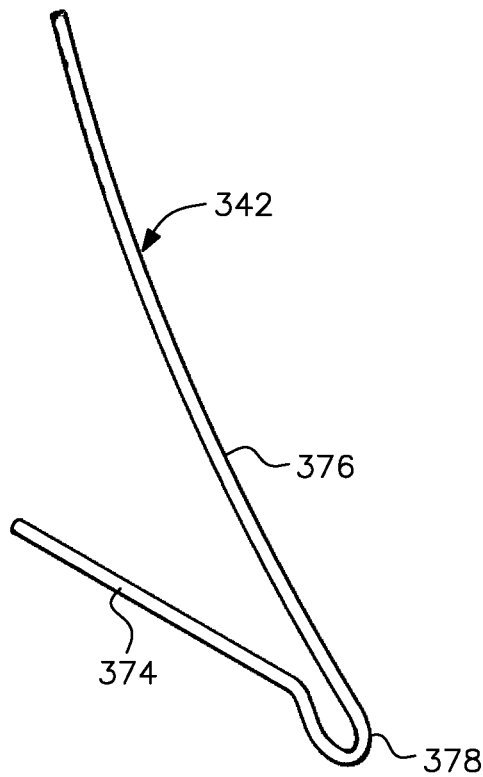
FIG. 14A is a perspective view of the guillotine spring of the trap shown in FIG. 1.
Figure 14B:
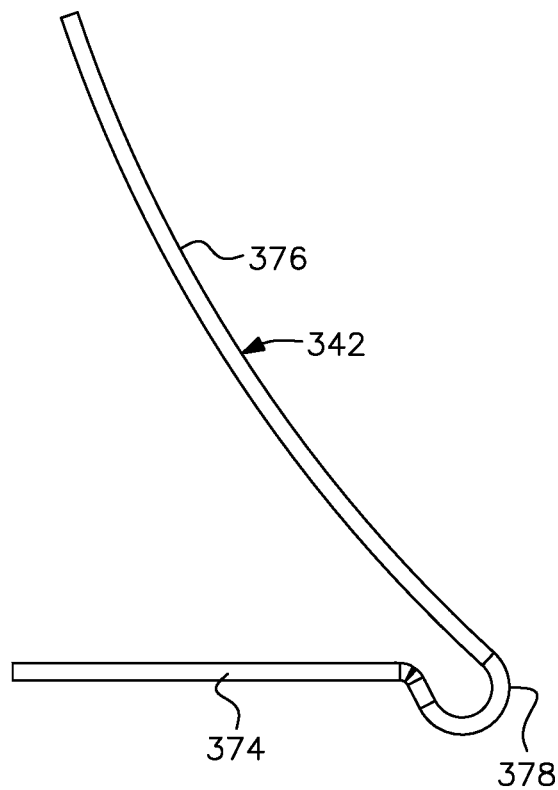
FIG. 14B is a side view of the guillotine spring shown in FIG. 14A.

As shown in FIGS. 14A and 14B, the guillotine spring element 342 is preferably a spring wire having an upper leg 374 and a lower leg 376 joined by a curved portion 378. The upper leg 374 is oriented longitudinally along the roof inside the trap enclosure. The upper housing part has openings 375 in the top through which the curved portion 378 protrudes (see FIGS. 8A and 9A). The lower leg 376 is received within the channel 124 formed by the boss that projects from the front side of the guillotine 340. The spring 342 exerts downward tension on the guillotine when the trap is set and enables the guillotine to spring downwardly with force once the trigger mechanism is activated. The guillotine bottom edge 132 is preferably not sharp enough to decapitate the rodent but is strong enough to inflict mortal injury and pin the dead rodent against the floor of the trap. The shape and width of the mouse pathway is very effective in properly orienting the rodent while the guillotine is positioned at a set distance with respect to the trip pedal to ensure an effective and well-placed blow as described earlier herein.

Figure 15A:
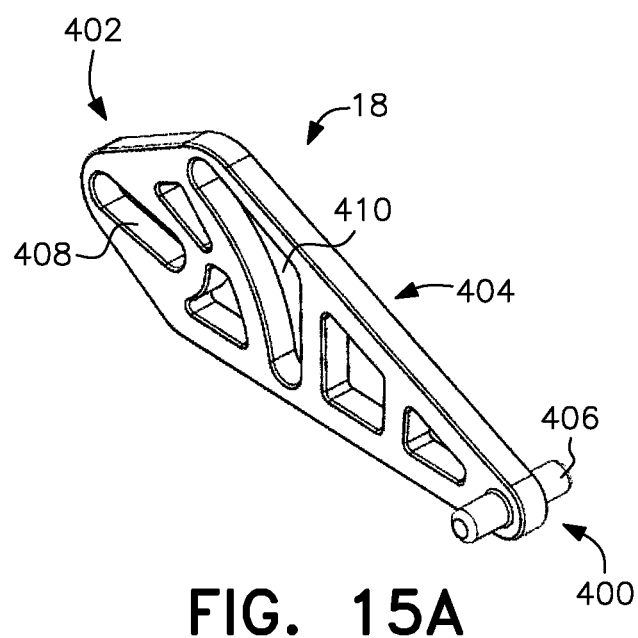
FIG. 15A is a perspective view of the link element of the trap shown in FIG. 1.
Figure 15B:
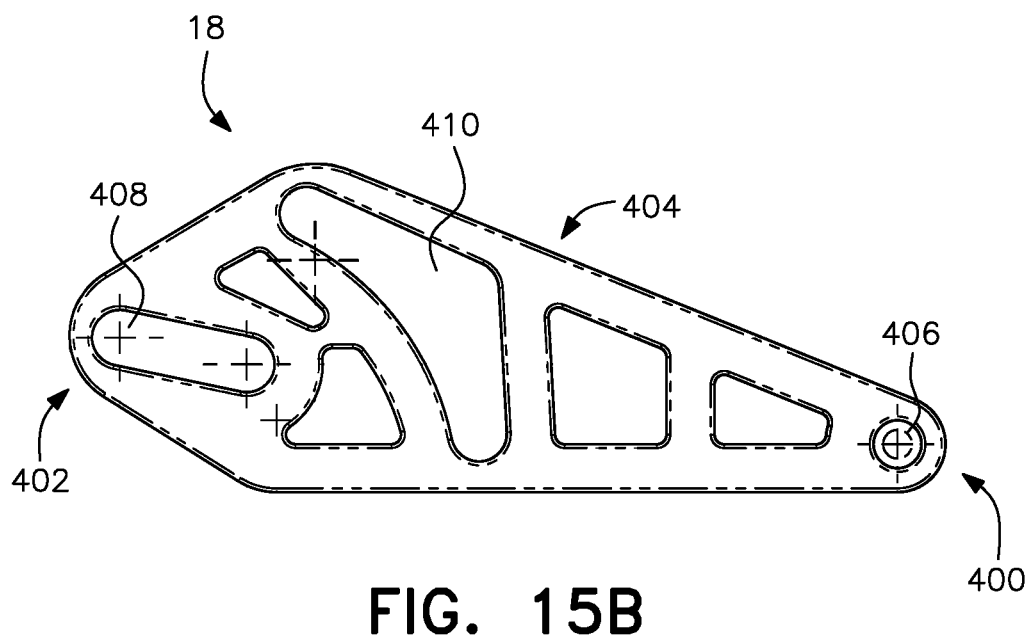
FIG. 15B is a side view of the link element shown in FIG. 15A.
Figure 15C:
FIG. 15C is a top view of the link element shown in FIG. 15B.

As shown in FIGS. 15A-15C, the pivoting link element 18 includes a rear end generally designated by reference numeral 400, a front end generally designated by reference numeral 402 and a middle portion generally designated by reference numeral 404. The rear end 400 has an element configured to pivotally couple the link element to the lower housing part which, in the embodiment shown, is embodied as a mounting pin 406. The front end 402 has a structure for engaging the entrance door, here embodied as an elongated door peg aperture or slot 408, and the middle portion has a structure for engaging the guillotine that is embodied as an elongated curved guillotine peg aperture or slot 410. Other engaging structures could be devised provided that corresponding alternate engagement structures are formed on the entrance door and guillotine. For example, pegs could be formed on the link element that would work cooperatively with apertures or slots that could be made in the entrance door and guillotine. Therefore, the invention is intended to cover other link element structures that could also perform the concurrent functions of entrance door opening and setting of the guillotine using an internally mounted element contained within the trap enclosure.

Figure 15D:
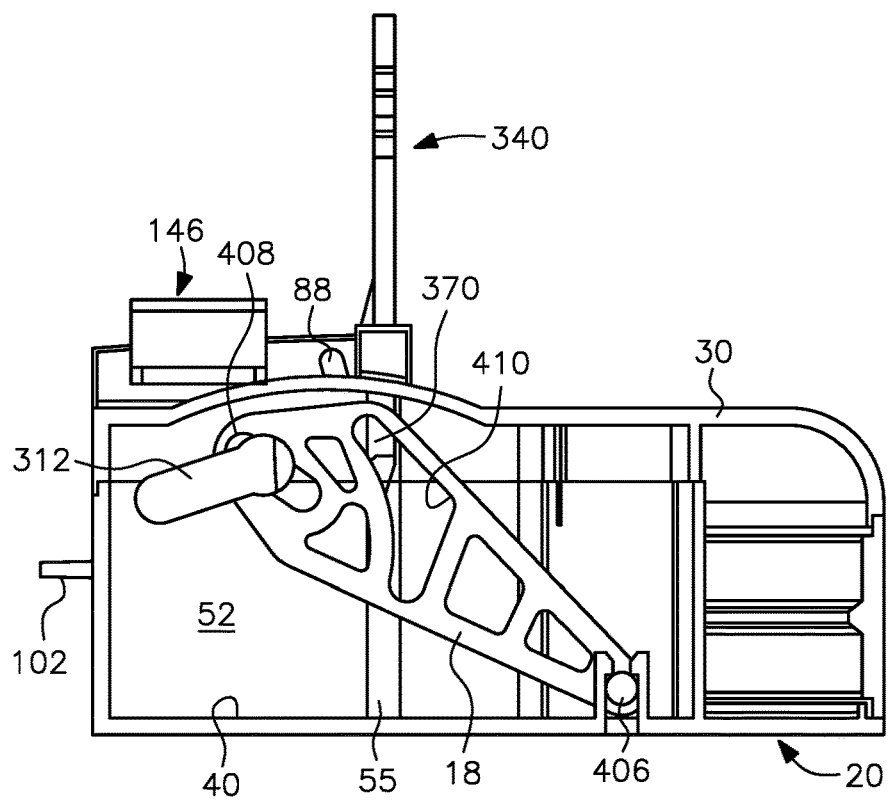
FIG. 15D is a cutaway side view of the trap showing the link element in the central dividing structure (shown with the near or right wall removed) with the guillotine in the set position, the guillotine peg engaged in the guillotine peg slot and the entrance door peg engaged in the entrance door slot.

As shown in FIG. 15D, the pivoting link element 18 is received within the channel 56 formed by the walls 52, 54 of the central dividing structure 50 of the lower housing part 20 and the mating wall structure 368 of the upper housing part 30, with the mounting pin 406 being pivotally captured in the clip structure 64 on the floor of the lower housing part within the enlarged portion 58 of the central dividing structure 50. The elongated door peg slot 408 receives the link element engaging peg 314 that projects from the arm 312 of the entrance door assembly 24 and the elongated curved guillotine peg slot 410 receives the link element engaging peg 370 on the lower part 344 of the guillotine 340.

Figure 15E:
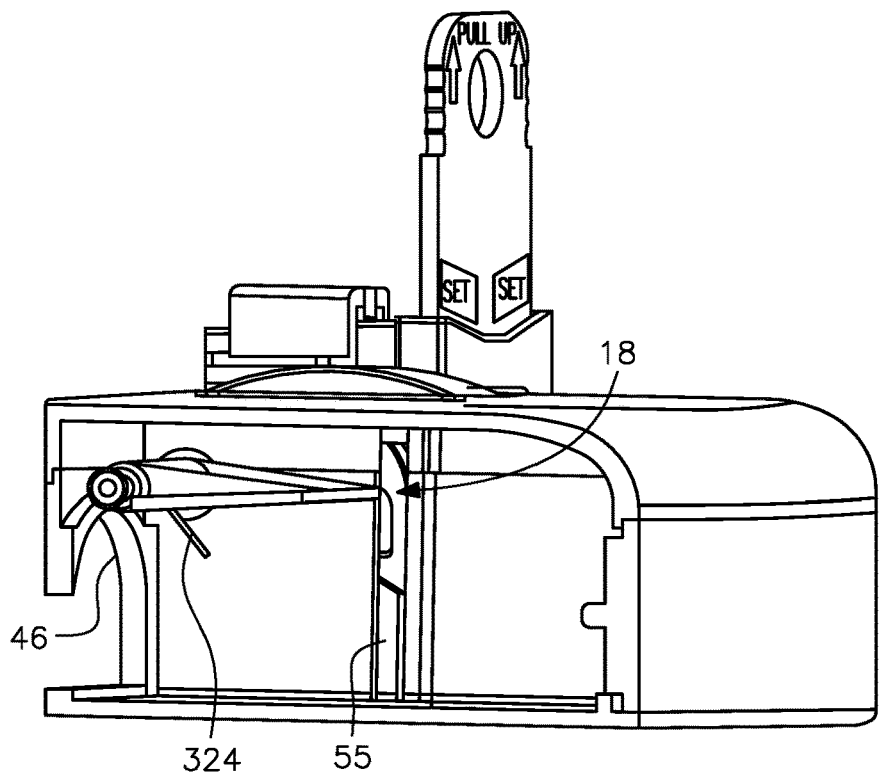
FIG. 15E is a cutaway side perspective view of the guillotine in the set position showing the entrance door in the open position (shown with the near or right wall of the central dividing structure in place).

When the upper part of the guillotine is grasped and pulled upwardly to a set position, the engagement of the guillotine peg 370 in the guillotine peg slot 410 lifts the front end 402 of the link element 18, causing the link element to pivot on the mounting pin 406 to an upper position; this pivoted link position, with the guillotine in the set position, is that shown in the cutaway view of FIG. 15D. As the front end 402 of the link element 18 moves upwardly, the engagement of the link element engaging peg 314 on the arm 312 of the entrance door assembly 24 in the elongated door peg slot 408 causes the entrance door 300 to rotate on the door pin 320 and move to the open position against the bias of the door spring 324 as shown in FIG. 15E. The arm of the entrance door when the door is in the open position can be seen in FIG. 15D (the entrance door itself is not shown), while in the door-side view shown of FIG. 15E the arm is hidden, being on the other side of the near or right wall 54 of the central dividing structure. Hence, as can be seen, once the guillotine 340 is engaged on the catch 144 in the set position, the entrance door is held in the opened position by the link element 18.

Figure 15F:
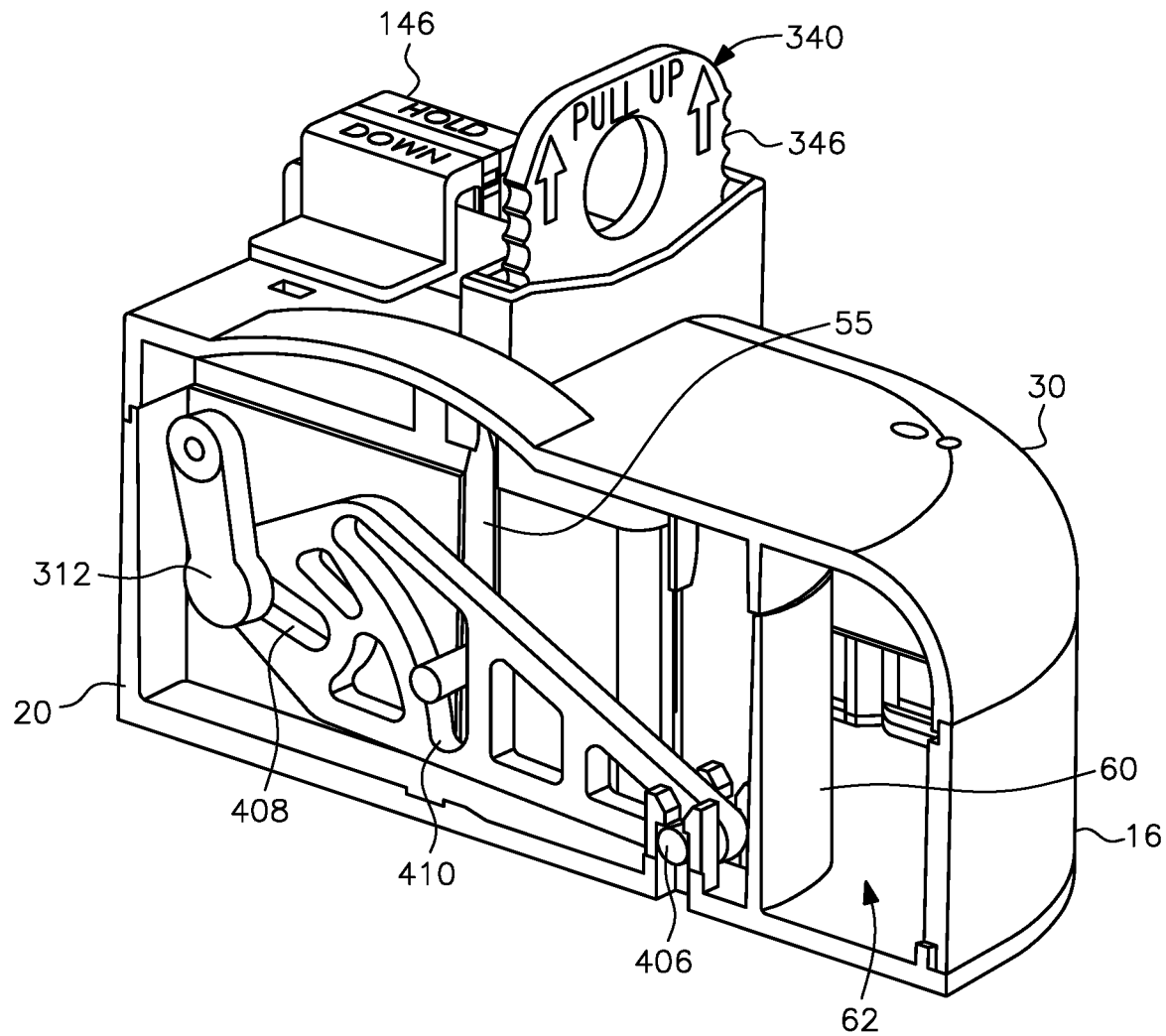
FIG. 15F is a cutaway rear perspective view of the trap showing the link element in the central dividing structure (shown with the near or right wall removed) with the guillotine in the unset or tripped position.
Figure 16A:
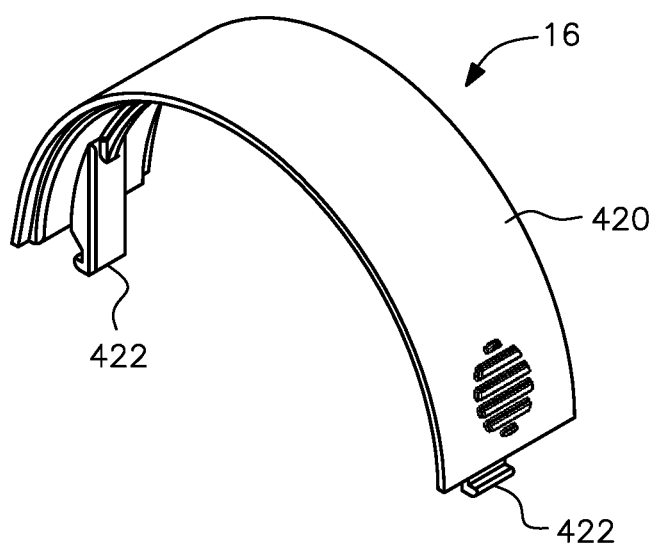
FIG. 16A is a perspective view of the disposal door of the trap shown in FIG. 1.
Figure 16B:
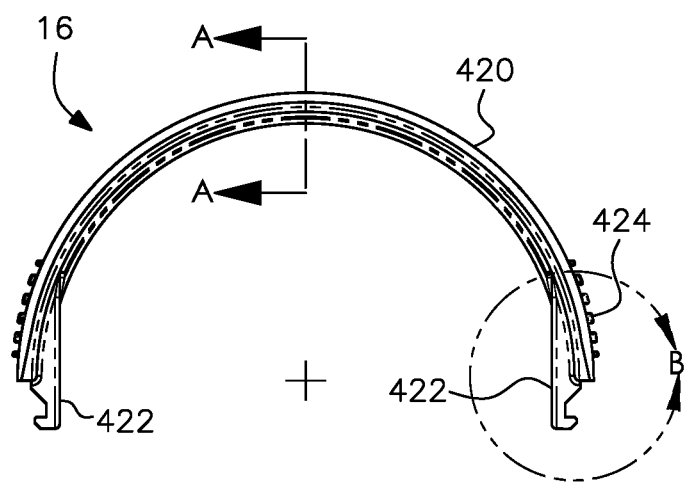
FIG. 16B is a top edge view of the disposal door shown in FIG. 16A.
Figure 16C:
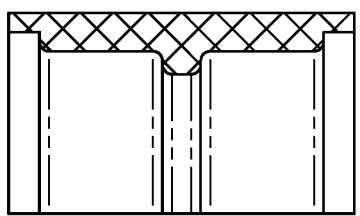
FIG. 16C is a sectional view taken along line A-A of FIG. 16B.
Figure 16D:
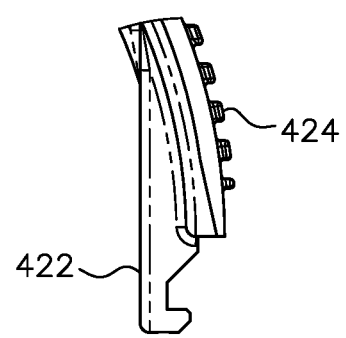
FIG. 16D is an enlarged view of Detail B from FIG. 16B.

When movement of the trip pedal causes disengagement of the guillotine from the catch, the guillotine moves downwardly under the bias of the guillotine spring 342. No longer being held up by the engagement of the guillotine peg 370 in the guillotine peg slot 410, the front end 408 of the link element is free to move downwardly, allowing the entrance door 300 to move to the closed position under the bias of the door spring 324. FIG. 15F shows the guillotine in the non-set or tripped position in which the link element has been released from upward engagement with the guillotine peg so that the front end of the link element has moved downwardly toward the floor. The arm 312 of the entrance door assembly 24 when the entrance door 300 is in the closed position can also be seen in FIG. 15F (the door itself is not shown).

The removable disposal door 16 is shown in various views in FIGS. 16A-16D and includes an elongated body 420 having a curvature to match the rear edge of the floor and the rear side of the upper housing part. Each end of the body 420 is provided with complementary connecting structures 41 on the rear edges of the side walls of the lower housing part (see FIG. 3C). The outer surface of the body adjacent the clip structures on each end preferably includes raised gripping strips 424 to make it easier for the user to squeeze the ends and remove the disposal door. Alternatively, the disposal door 16 could be hinged along the rear edge of one side wall 38.

As shown in FIGS. 1 and 2, when the trap is assembled, the guillotine 340 is received within the guillotine channel 70 and the catch 144 of the trigger assembly 142 is received within the trigger channel 80 so that the hold down component 146 is supported on the upper surface of the upper housing part. The pivot bar 168 of the trip pedal 140 is hingedly mounted within the C-shaped cutout 362 in the hinge-forming arm 360, with the lip 176 at the top of the trip pedal held in abutment against the hook 194 on the catch.

To activate the mouse trap, the user first opens the bait door 22 and places bait inside the circular collar 106 provided on the inside of the bait door. The user then closes the bait door and sets the trap by using one hand to hold down the hold down component 146 of the trigger mechanism while at the same time using the other hand to pull up on the guillotine 340. As the guillotine moves upwardly, tension is increased upon the guillotine spring 342. While the projections 204 on the rearward end of the catch remain captured by the apertures 88 in the trigger channel walls 76, the play provided by the angled oblong shape of the apertures 88 enables the rearward end 182 of the catch to move upwardly, with the projections 204 moving upwardly in the slots 88. Once the setting ledge 118 on the guillotine 340 clears the setting platform 202 on the catch, the rearward end of the catch moves down so that the engagement between the setting ledge 118 and the setting platform 202 prevents the guillotine from moving back down (see FIGS. 17 and 18). The guillotine is then in the set position, with the projections 204 positioned in the bottom, of the slots 88.

Concurrently with the raising of the guillotine 340 to the set position, the entrance door 300 is pivoted to the open position through the engagement of the guillotine and door pegs in the corresponding link element apertures as described earlier herein. Particularly, when the upper part 346 of the guillotine 340 is grasped and pulled upwardly, the link element 18 pivots on the mounting pin 406 in response to the engagement of the guillotine peg 370 in the guillotine peg slot 410 to lift the front end 402 of the link element 18.

In response to upward movement of the front end of the link element, the engagement of the link element engaging peg 314 on the arm 312 of the entrance door assembly 24 in the elongated door peg slot 408 causes the entrance door 300 to rotate on the door pin 320 and move to the open position against the bias of the door spring 324.

Figure 18:
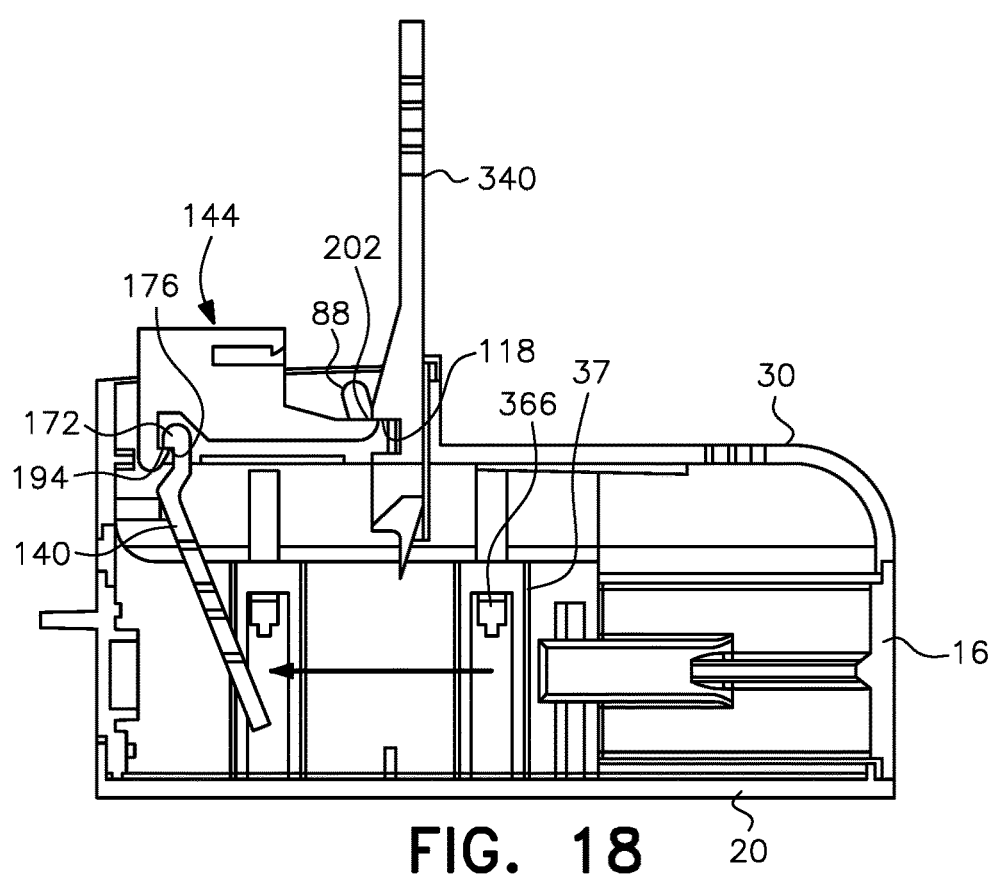
FIG. 18 is a cutaway side view of the components and parts shown in FIG. 17, indicating the direction of movement taken by the trip pedal when the trap is tripped to release the guillotine from the set position through disengagement from the catch.

When a mouse attempts to reach the bait located in the collar on the bait door, the mouse will touch or move the trip pedal 140. The lower portion of the trip pedal moves from right to left, with respect to the trap as shown in FIG. 18, through pivoting movement of the trip pedal on the pivot rod 168 within the cutout 362 in the hinge forming arm 360. This pivoting movement causes the head 172 of the trip pedal arm 170 to move clockwise (to the right in FIG. 18) so that the lip 176 on the trip pedal arm head 170 is disengaged from the catch hook 194. Once the catch hook 194 is released, the rear of the catch 144 is free to move downwardly under the force of the guillotine spring 342. Downward movement of the rear of the catch into the trigger channel is sufficient to disengage the guillotine ledge 118 from the support platform 202 of the catch, releasing the guillotine from its set position. The guillotine, with the force of the guillotine spring, is then free to descend in a quick downward motion through the guillotine channel and into the mouse pathway in the trap enclosure, thereby striking and instantly killing the mouse. At the same time, the downward movement of the guillotine releases the upward engagement between the guillotine peg in the guillotine slot, allowing the front end of the link element to move downward and the entrance door to close under the bias of the door spring.

To empty the device once a mouse has been dispatched therein, the user simply removes the disposal door 16, pulls up on the guillotine 340 to release the mouse from its pinned position against the floor, and then drops the mouse into a proper disposal container through the open rear end 31 of the trap. The user is spared from having to see or handle the expired rodent because it is substantially contained within the trap enclosure and the mechanics allow for quick and easy removal without the user having to handle or come into contact with the expired rodent. The trap is sturdy and reusable in both indoor and outdoor environments, requiring no electrical or electronic parts or mechanisms.

While the exact dimensions of the trap may be varied, representative dimensions are described hereinafter.

In the assembled and set position of the trap, the overall height of the trap including the guillotine is from between about 3 inches to about 4 inches, and is about 3.27 inches in a preferred embodiment. In the set position, the lower edge of the guillotine is approximately 0.81 inches above the floor of the trap. When the trap is tripped, the overall height of the trap is reduced to be between about 2.0 inches to about 3.0 inches, and is about 2.47 inches in a preferred embodiment.

The height of the housing is between about 1.3 inches and about 1.4 inches, and is about 1.35 inches in a preferred embodiment. The distance from the floor of the trap to the top of the guillotine channel, as projecting above the housing, is between about 1.7 inches and about 1.8 inches, and is about 1.77 inches in a preferred embodiment. The distance from the floor of the trap to the top of the trigger mechanism, as projecting above the housing, is between about 1.75 inches and about 1.9 inches, and is about 1.84 inches in a preferred embodiment.

The overall length of the trap is between about 3.5 inches and about 4.5 inches, and is about 4.0 inches in a preferred embodiment.

The exterior width of the trap is about 2.45 inches to about 3.65 inches, and is about 3.25 inches in a preferred embodiment. The pathway is about 0.68 inches wide.

The distance from the guillotine in the guillotine channel 70 to the entrance door of the trap, as traveled by a mouse along the pathway of the trap, is between about 3.0 inches and about 8.0 inches, and is about 5.85 inches in a preferred embodiment.

The inside distance between the collar 106 with the bait recess 108 and the guillotine is between about 0.5 inches to about. 2.0 inches, and in a preferred embodiment is about 1.125 inches.

The foregoing is considered as illustrative only of the principles of the invention. Since numerous modifications and changes will readily occur to those skilled in the art, if is not desired to limit the invention to the exact construction and operation shown and described. Accordingly, all suitable modifications and equivalents may be resorted to, falling within the scope of the invention.

What is claimed is:

1. A mouse trap comprising:
   a trap enclosure having a bait door aperture and an entrance opening;
   a bait door associated with the bait door aperture;
   an entrance door mounted adjacent the entrance opening and having an open position when the trap is set and a closed position when the trap is tripped, the entrance door being spring biased to the closed position;
   a trigger mechanism including a trip pedal and a catch operatively engaged with said trip pedal;
   a guillotine oriented substantially perpendicular to a floor of the trap enclosure and having at least a lower part extending into said trap enclosure, said guillotine configured to engage with said catch and be held above the floor when the guillotine is pulled into a set position, said guillotine including a peg extending outwardly from a lower end thereof;
   a link element operatively coupled to said guillotine and said entrance door to open said entrance door when said guillotine is pulled to the set position, said link element including a slot therein for engaging with said guillotine peg so that movement of the guillotine also moves the link element and the entrance door; and
   a guillotine spring biasing said guillotine to move to a lowered position adjacent the floor when the guillotine becomes disengaged from said catch through movement of the trip pedal by a rodent inside the trap enclosure, downward movement of the guillotine acting on the link element, through said engagement of said guillotine peg with the link element slot, to allow the spring-biased entrance door to move to the closed position.

2. A mouse trap comprising:
   a trap enclosure having a bait door aperture and an entrance opening;
   a bait door associated with the bait door aperture;
   an entrance door mounted adjacent the entrance opening and having an open position when the trap is set and a closed position when the trap is tripped, the entrance door being spring biased to the closed position;
   a trigger mechanism including a trip pedal and a catch operatively engaged with said trip pedal;
   a guillotine oriented substantially perpendicular to a floor of the trap enclosure and having at least a lower part extending into said trap enclosure, said guillotine configured to engage with said catch and be held above the floor when the guillotine is pulled into a set position;
   a link element operatively coupled with link element engaging structures on said guillotine and said entrance door so that said link element opens said entrance door when said guillotine is pulled to the set position, said link element having a rear end, a front end and a middle portion therebetween;
   said link element engaging structure on the entrance door including an outwardly projecting door peg, and said link element engaging structure on said guillotine including an outwardly projecting guillotine peg, said door and guillotine pegs being received within respective door and guillotine slots in the link element so that movement of the guillotine also moves the link element and the entrance door through engagement of the pegs within the slots, said door slot being elongated in shape and being formed in said front end of said link element, said guillotine slot being an elongated aperture formed in said middle portion of said link element, engagement of the guillotine peg in the guillotine slot when the guillotine is raised to the set position lifting the front end of the link element which, in turn, causes upwardly directed engagement of the door peg with the door slot to lift the entrance door to the open position; and
   a guillotine spring biasing said guillotine to move to a lowered position adjacent the floor when the guillotine becomes disengaged from said catch through movement of the trip pedal by a rodent inside the trap enclosed, downward movement of the guillotine acting on the link element to allow the spring-biased entrance door to move to the closed position.

3. The mouse trap as set forth in claim 2, wherein said trap enclosure is formed by a lower housing part, an upper housing part and a disposal door, said lower housing part having side walls, a floor and a front panel, said bait door aperture and said entrance opening being formed in said front panel, said disposal door being positioned at a rear end of the trap opposite the front panel.

4. The mouse trap as set forth in claim 3, further comprising a central dividing structure that extends from said front panel into said trap enclosure to define, with said side walls and said disposal door, generally U-shaped mouse pathway extending from said entrance door to said bait door through the trap enclosure.

5. The mouse trap as set forth in claim 4, wherein said central dividing structure includes a pair of parallel walls extending rearward from the front panel and defining a channel therebetween, said link element being pivotally mounted in said channel.

6. The mouse trap as set forth in claim 5, wherein said central dividing structure includes an enlarged portion located rearwardly of said parallel walls, said enlarged portion being separated from said parallel walls by a slot, said guillotine peg extending through said slot and into the guillotine slot in said link element.

7. The mouse trap as set forth in claim 2, wherein said entrance door includes an arm, said door peg projecting outwardly from said arm.

8. The mouse trap as set forth in claim 2, wherein the link element is wholly contained within the trap enclosure.

9. A mouse trap comprising;
   housing defining a trap interior, said housing including side walls, a floor and a front panel, said front panel having a bait door aperture and an entrance opening;
   a bait door associated with the bait door aperture;
   an entrance door mounted adjacent the entrance opening and having an open position when the trap is set and a closed position when the trap is tripped, the entrance door being spring biased to the closed position and configured to close the entrance opening in said closed position, said entrance door including an outwardly projecting door peg;

a curved rear disposal door opposite the front panel and a central dividing structure that extends from said front panel into said trap interior to define, with said side walls and said disposal door, a U-shaped rodent pathway that extends from said entrance door to said bait door, said central dividing structure including a pair of parallel walls extending rearwardly from the front panel and defining a channel therebetween;

a link element pivotally mounted in said channel, said link element having a rear end, a front end and a middle portion therebetween, said rear end being pivotally mounted to the floor, said front end having an elongated door slot that receives the outwardly projection door peg, and said middle portion including an elongated aperture;

a trigger mechanism including a trip pedal positioned in said pathway and a catch operatively engaged with said trip pedal;

a guillotine configured to engage with said catch when the guillotine is pulled into a set position, said guillotine including an outwardly projecting guillotine peg that engages with the elongated aperture in the middle portion of the link element so that when the guillotine is raised to the set position, the link element pivots within the channel to lift the front end of the link element which, in turn, causes upwardly directed engagement of the door peg with the elongated door slot to lift the entrance door to the open position; and a guillotine spring biasing said guillotine to move from the set position to a killing position when the guillotine becomes disengaged from said catch through movement of the trip pedal by a rodent inside the trap interior, movement of the guillotine to the killing position acting upon the link element to allow the spring-biased entrance door to move to the closed position.

10. The mouse trap as set forth in claim 9, wherein the link element is wholly contained within the trap enclosure.

\* \* \* \* \*